United States Patent
Norikane et al.

(10) Patent No.: US 8,012,663 B2
(45) Date of Patent: Sep. 6, 2011

(54) TONER MANUFACTURING METHOD, TONER MANUFACTURING APPARATUS, AND TONER MANUFACTURED BY WAY OF THE TONER MANUFACTURING METHOD THEREOF

(75) Inventors: Yoshihiro Norikane, Yokohama (JP); Shinji Aoki, Yokohama (JP); Tetsuya Sonoda, Yokohama (JP); Keisuke Uchida, Hachiohji (JP)

(73) Assignee: Ricoh Company, Ltd., Tokyo (JP)

( * ) Notice: Subject to any disclaimer, the term of this patent is extended or adjusted under 35 U.S.C. 154(b) by 152 days.

(21) Appl. No.: 12/401,344

(22) Filed: Mar. 10, 2009

(65) Prior Publication Data

US 2009/0226837 A1    Sep. 10, 2009

(30) Foreign Application Priority Data

Mar. 10, 2008    (JP) .................. 2008-059169

(51) Int. Cl.
  *G03G 9/08*        (2006.01)
(52) U.S. Cl. .................. 430/137.19
(58) Field of Classification Search .............. 430/137.19
  See application file for complete search history.

(56) References Cited

U.S. PATENT DOCUMENTS

| 2002/0180123 | A1* | 12/2002 | Kawasaki | 266/202 |
| 2004/0048183 | A1* | 3/2004 | Teshima | 430/137.1 |
| 2004/0152006 | A1* | 8/2004 | Teshima | 430/109.4 |
| 2009/0117486 | A1 | 5/2009 | Watanabe et al. | |

FOREIGN PATENT DOCUMENTS

| EP | 1 978 411 A2 | 10/2008 |
| EP | 1 978 411 A3 | 10/2008 |
| EP | 1 992 993 A2 | 11/2008 |
| EP | 1 992 995 A2 | 11/2008 |
| JP | 07-152202 | 4/1981 |
| JP | 57-201248 | 12/1982 |
| JP | 3786034 | 9/2003 |
| JP | 3786035 | 9/2003 |
| JP | 2008-276146 | 11/2008 |

OTHER PUBLICATIONS

U.S. Appl. No. 12/342,803, filed Dec. 23, 2008, Kuramoto, et al.
U.S. Appl. No. 12/405,741, filed Mar. 17, 2009, Honda, et al.

* cited by examiner

*Primary Examiner* — Hoa V Le
(74) *Attorney, Agent, or Firm* — Oblon, Spivak, McClelland, Maier & Neustadt, L.L.P.

(57) ABSTRACT

A method of manufacturing a toner includes preparing a droplet forming device, comprising a storage portion to store a toner composition solution, a thin film formed from a rigid material, bonded to the storage portion by a bonding material, and provided with a nozzle and an oscillation device including an oscillation generation device configured to generate an oscillation upon the thin film and an oscillation amplification device which has an oscillation surface including a position that is parallel and opposite to the thin film and is configured to amplify the oscillation, periodically forming a droplet of the toner composition solution including at least a resin and a coloring agent to be supplied between the thin film and the oscillation surface and discharging the droplet via the nozzle, and solidifying the droplet of the toner composition solution discharged via the nozzle, and forming a toner particle.

7 Claims, 8 Drawing Sheets

FIG. 8A
FIG. 8B
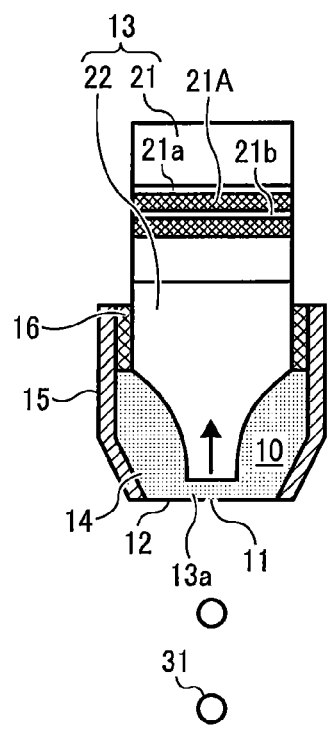
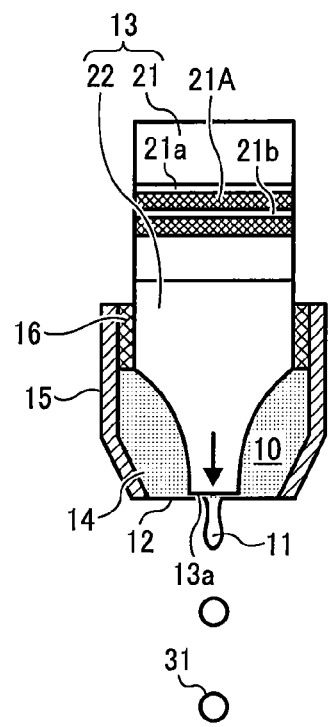
FIG. 8C
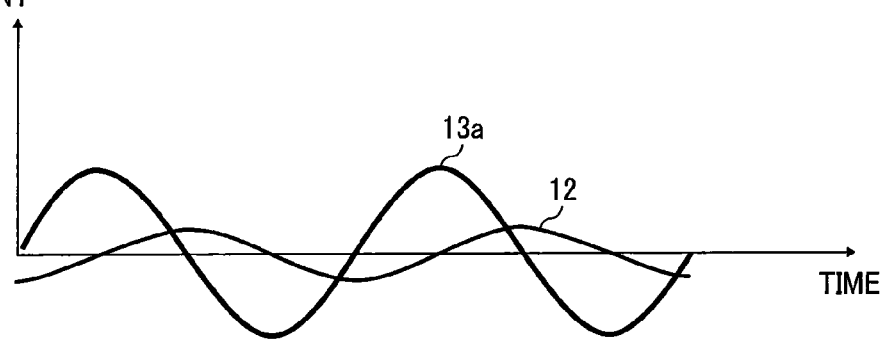

TONER MANUFACTURING METHOD, TONER MANUFACTURING APPARATUS, AND TONER MANUFACTURED BY WAY OF THE TONER MANUFACTURING METHOD THEREOF

CROSS-REFERENCE TO THE RELATED APPLICATION

The present application is based on and claims the priority benefit of Japanese Patent Application No. 2008-059169, filed on Mar. 10, 2008, the disclosure whereof is incorporated herein by reference in its entirety.

BACKGROUND OF THE INVENTION

1. Field of the Invention

A developing solution that is used for developing an electrostatic latent image, with respect to such as an electrophotograph, an electrostatic recording, or an electrostatic printing, is, as an instance thereof, in a course of a process of developing thereupon, temporarily adhered upon an image support body, such as an electrostatic latent image support body whereupon is formed an electrostatic latent image, transferred thereafter, in a course of a process of transferring thereupon, from the electrostatic latent image support body to a transfer medium, such as a transfer sheet of print paper, and fixed thereafter upon a surface of the print paper thereof in a course of a process of fixing thereupon.

In such a circumstance, as a developing solution for developing the electrostatic latent image that is formed upon a support surface thereof, a two component type developing solution is known that is formed from a carrier and a toner, as is a single component developing solution that does not require the carrier, i.e., a magnetic toner or a non-magnetic toner.

2. Description of the Related Art

Conventionally, a so-called powdered toner, wherein a toner binder, such as a styrene resin or a polyester resin is melted and mixed together with such as a coloring agent, which is thereupon pulverized into a fine particulate mass thereof, is widely employed as a dry toner, which in turn is employed as an electrophotograph, an electrostatic recording, or an electrostatic printing.

In addition, in recent times, an investigation has been performed with regard to a so-called compound type of toner, i.e., a toner manufacturing method by way of a suspension polymerization method or an emulsion polymer condensation method. A method of creation is also being investigated in addition thereto, in accordance with a volumetric shrinkage that is referred to as a polymer dissolution suspension method; refer to Japanese Patent Application Laid Open No. H07-152202 for particulars. The method thereof involves dispersing and dissolving a toner material within a volatile solvent, such as an organic solvent comprising a low boiling point, emulsifying and liquefying the toner thus dispersed and dissolved within a water based medium whereupon a dispersing agent is present, and removing the volatile solvent thereafter. The method thereof is superior in that, unlike the suspension polymerization method or the emulsion polymer condensation method, a universality of a resin that may be employed thereupon is wider, and it would be possible to employ a polyester resin that would be effective in a full color process, wherein a clarity and a post fixing smoothness of an image portion is particularly demanded.

With respect to the compound type of toner described herein, however, it is known that presuming the precondition of using the dispersing agent within the water based medium leads by no means to a satisfactory manufacturing method thereof, in that doing so results in a fault arising therewith, such as the dispersing agent, which may degrade a charge characteristic of the toner, being left upon an obverse surface of the toner thereof, and thereupon degrading an environmental friendliness of the toner thereof, with an unusually large volume of water required for washing the toner, in order to remove the dispersing agent thereupon.

On the other hand, a spray desiccation particle method is well established as a method of manufacturing the toner without employing the water based medium thereupon; refer to Japanese Patent Application Laid Open No. S57-201248 for particulars. The spray desiccation particle method of manufacturing the toner obtains a particle of the toner by employing a wide range of atomizers to discharge, in a fine particulate state, either a toner composition element fusion solution, or a solution wherein a toner composition liquid is dissolved, and desiccating the particle thus discharged. The fault thus associated with employing the water based medium is thereby avoided as a result.

The particle that is obtained by way of a conventional spray desiccation particle method, however, is comparatively rough and large, and also comprise a wide distribution of a degree of a particle thereof, thereby engendering a degradation of a characteristic of the very toner that is thus manufactured.

A method and a device has thus been proposed, as a method of manufacturing the toner that substitutes for the methods described herein, wherein a piezoelectric pulse is used to form a fine grain droplet, which is then further desiccated and hardened to produce the toner; refer to Japanese Patent No. 3,786,034 for particulars. Furthermore, a production method has also been proposed wherein a thermal expansion within a nozzle is used to form the fine grain droplet, which is then further desiccated and solidified to produce the toner particle, as per Japanese Patent No. 3,786,034; refer to Japanese Patent No. 3,786,035 for particulars.

With regard to the method of manufacturing the toner, and the device for manufacturing the toner, that is disclosed according to Japanese Patent No. 3,786,034 and Japanese Patent No. 3,786,035, however, a problem of an inefficiency in manufacturing arises, in that it is only possible to employ a single piezoelectric element to perform a droplet discharge from a single nozzle of the device thereof, and thus, a quantity of the droplet that may be discharged thereby on a time unit basis is low.

The inventor of the present invention has thus proposed a method of manufacturing the toner wherein a plurality of nozzles are formed within a metallic thin film, a horn shaped oscillation amplification device is employed to form the droplet by generating an oscillation within the metallic thin film whereupon the plurality of nozzles are formed, and the toner particle is formed by way of a solidification device; refer to Japanese Patent Application Publication No. 2008-276146 for particulars.

According to the application of the prior invention, the oscillation of the metallic thin film causes a oscillation of a complex shape to occur upon an oscillation surface of the metallic thin film at a high frequency band, such as 100 kHz, thereby forming the nozzle only upon a comparatively stable oscillating portion of the oscillation surface of the metallic thin film.

Whereas, from a standpoint of efficiency in manufacturing, the more nozzles that are formed upon the metallic thin film, the better, the complex shape of the oscillation arises upon the oscillation surface of the metallic thin film at the high frequency band, resulting in an unstable oscillation upon the metallic thin film, and thus limiting a quantity of the nozzle that is to be formed upon the metallic thin film. As a consequence thereof, a problem arises with regard to the metallic thin film according to the application of the prior invention wherein a restriction upon the quantity of the nozzles that is to be formed upon the metallic thin film and a positioning of the metallic thin film is overly restricted.

The inventor of the present invention and others have thus completed the present invention as a result of a diligent investigation into a configuration that is capable of stabilizing the oscillation of the thin film whereupon the nozzle is to be formed across the overall oscillation surface of the metallic thin film, and of positioning as many nozzles as possible within a oscillation surface region of the thin film.

SUMMARY OF THE INVENTION

An object of the present invention is to provide a toner manufacturing method, a toner manufacturing device that uses the toner manufacturing method, and a toner that is obtained by way of the toner manufacturing method thereof, which is capable of improving an efficiency of manufacturing the toner, and furthermore, of obtaining a toner, a liquidity and a width of a fluctuation of a large quantity of a characteristic value, i.e., an eigenvalue, that is demanded of a charged characteristic toner, is smaller than a width of a fluctuation of a large quantity of a characteristic value, i.e., an eigenvalue, that is obtained by way of a conventional toner manufacturing method.

In order to achieve the above object, a method of manufacturing a toner according to an embodiment of the present invention includes preparing a droplet forming device, comprising a solution storage portion configured to store a toner composition solution, a thin film formed from a rigid material, bonded to the solution storage portion by way of a bonding material, and provided with at least one nozzle, and an oscillation device including an oscillation generation device configured to generate an oscillation upon the thin film and an oscillation amplification device which has an oscillation surface including a position that is parallel and opposite to the thin film and is configured to amplify the oscillation generated with the oscillation generation device, periodically forming a droplet of the toner composition solution including at least a resin and a coloring agent to be supplied between the thin film and the oscillation surface and discharging the droplet via the at least one nozzle, and solidifying the droplet of the toner composition solution discharged via the at least one nozzle, and thereby forming a toner particle.

In addition, a device for manufacturing a toner according to an embodiment of the present invention includes a solution storage portion, a thin film bonded to the solution storage portion by way of a bonding material, and provided with at least one nozzle, and a droplet forming device, comprising an oscillation device including an oscillation generation device configured to generate an oscillation upon the thin film and an oscillation amplification device including an oscillation surface which has a position that is parallel and opposite to the thin film and is configured to amplify the oscillation that is generated with the oscillation generation device. A droplet of a toner composition solution including at least a resin and a coloring agent to be supplied between the thin film and the oscillation surface is periodically formed and discharged via the at least one nozzle. The droplet of the toner composition solution discharged via the at least one nozzle is solidified to form a toner particle. The thin film is formed from a rigid material.

BRIEF DESCRIPTION OF THE DRAWINGS

FIG. 2 is a diagram that depicts a configuration of a droplet forming unit according to the present invention, wherein FIG. 2A is a cutaway side elevation view of the droplet forming unit, and FIG. 2B is a cutaway frontal elevation view of the droplet forming unit.

FIG. 8 is a diagram that describes an effect of the droplet forming unit that is depicted in FIG. 2, wherein FIG. 8A depicts a state of the droplet forming unit prior to a discharge of a toner composition solution, FIG. 8B depicts a state of the droplet forming unit subsequent to the discharge of the toner composition solution, and FIG. 8C depicts a relationship between an oscillation wave form of an oscillation amplification device and an oscillation wave form of a thin film.

FIG. 11 is a diagram that depicts a relationship between a plan view that depicts a shape of a thin film that is depicted in FIG. 2 and an oscillation, wherein

DETAILED DESCRIPTION OF THE PREFERRED EMBODIMENTS

Following is a detailed description of preferred embodiments of the present invention, with reference to the attached drawings.

Figure 1:
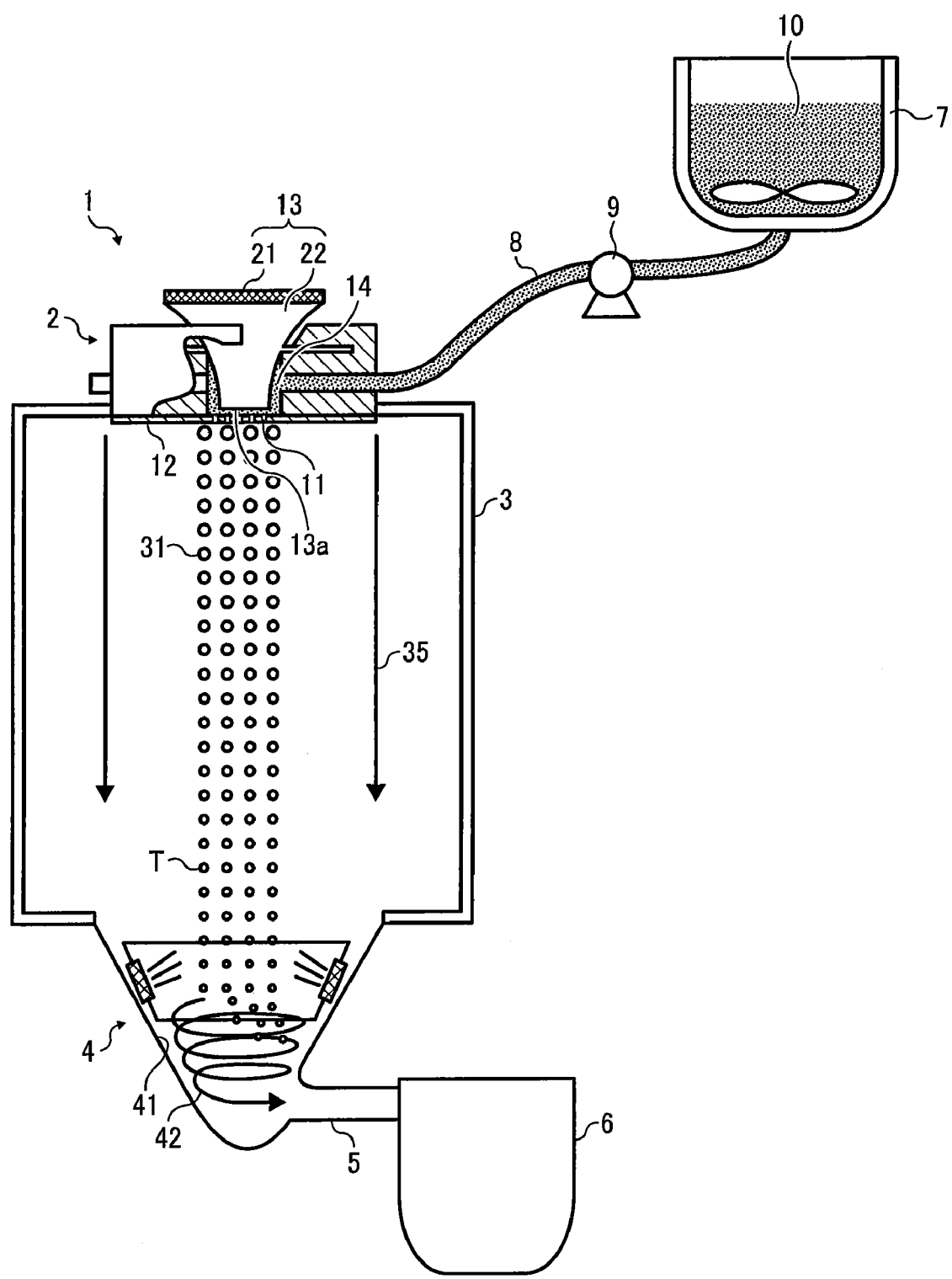
FIG. 1 is a conceptual diagram that depicts an overall configuration of a toner manufacturing device according to the present invention.

The description will commence with a first embodiment of a device for manufacturing a toner according to the present invention that implements a method for manufacturing a toner according to the present invention, with reference to FIG. 1. A method of manufacturing a toner according to an embodiment of the present invention includes forming a plurality of droplets from a toner composition solution, while imparting an oscillation to the toner composition solution and forming a toner particle by solidifying the plurality of droplets of the toner composition solution. The method of manufacturing a toner, according to an embodiment of the present invention includes preparing a droplet forming device 2, comprising a solution storage portion 14 configured to store a toner composition solution 10, a thin film 12 formed from a rigid material, bonded to the solution storage portion by way of a bonding material, and provided with at least one nozzle 11 and an oscillation device 13 including an oscillation generation device configured to generate an oscillation upon the thin film and an oscillation amplification device which has an oscillation surface including a position that is parallel and opposite to the thin film and is configured to amplify the oscillation generated with the oscillation generation device, periodically forming a droplet 31 of the toner composition solution including at least a resin and a coloring agent to be supplied between the thin film and the oscillation surface and discharging the droplet via the at least one nozzle, and solidifying the droplet of the toner composition solution discharged via the at least one nozzle, and thereby forming a toner particle T. The rigid material may include a ceramic and the nozzle may be formed upon a surface region that is opposite to the oscillation surface. The droplet forming device is formed so as to comprise a larger area than a binding area configured to bond the oscillation surface of the oscillation amplification device to the oscillation generation device. It is preferable that a frequency of the oscillation that is generated by the oscillation generation device falls into a range that is greater than or equal to 20 kHz and less than 2.0 MHz. The droplet forming device may be formed so as to comprise a larger area than a binding area configured to bond the oscillation surface of the oscillation amplification device to the oscillation generation device. Furthermore, it is preferable that a particle size distribution, which is obtained by a weight-average particle diameter of toner particles divided by a number-average particle diameter of the toner particles, is in a range between 1.00 and 1.15. A weight-average particle diameter may be in a range between 1 to 20 µm.

Conceptual Description of Overall Configuration of Device

In FIG. 1, reference numeral 1 denotes a toner manufacturing device. The device for manufacturing the toner 1 comprises a droplet discharge unit, i.e., a droplet forming device, 2, which forms a toner composition solution, which further comprises, at a minimum, a resin and a coloring agent, into a droplet, and discharges the droplet thus formed of the toner composition solution, a particle forming portion, i.e., a particle forming device, 3, comprising the droplet discharge unit 2 upon an upper portion of the particle forming portion 3, and which forms a toner particle T by solidifying a droplet of the toner composition solution that is formed into the droplet, and discharged thereupon, from the droplet discharge unit 2, a toner collection portion 4, which collects the toner particle T that is formed with the particle forming portion 3, a toner storage portion, i.e., a toner storage device, 6, which stores the toner particle T that is collected with the toner collection portion 4 and is transferred to the toner storage portion 6 by way of a tube 5, a raw material housing portion 7, which houses a toner composition solution 10, a pipe, i.e., a fluid transfer tube, 8, which transfers the toner composition solution 10 from within the raw material housing portion 7 to the droplet discharge unit 2, and a pump 9, which is for a force feed delivering of the toner composition solution 10, such as when the toner manufacturing device 1 is activated.

In addition, the toner composition solution 10 that is delivered from the raw material housing portion 7 is supplied to the droplet discharge unit 2 in a self-feeding manner, by way of a droplet forming phenomenon that is caused by the droplet discharge unit 2. According to the embodiment, the pump 9 is employed to perform a supplemental supply of the solution at a time such as when the toner manufacturing device 1 is activated. It is to be understood that, in the present circumstance, a solution or a dispersal is employed as the toner composition solution 10, wherein a toner composition substance, comprising, at a minimum, a resin and a coloring agent, is dissolved or dispersed in a solvent.

Description of Conceptual Configuration of Droplet Discharge Unit 2

It is to be understood that, for purposes of convenience of description therein, a portion of the description of a conceptual configuration hereinafter will overlap with a portion of the conceptual description of the overall configuration of the device that has been described herein.

Following is a description of the droplet discharge unit 2, with reference to FIG. 2A and FIG. 2B. It is to be understood that FIG. 2A and FIG. 2B is a cutaway configuration diagram that depicts a conceptual configuration of the droplet discharge unit 2.

Figure 2:
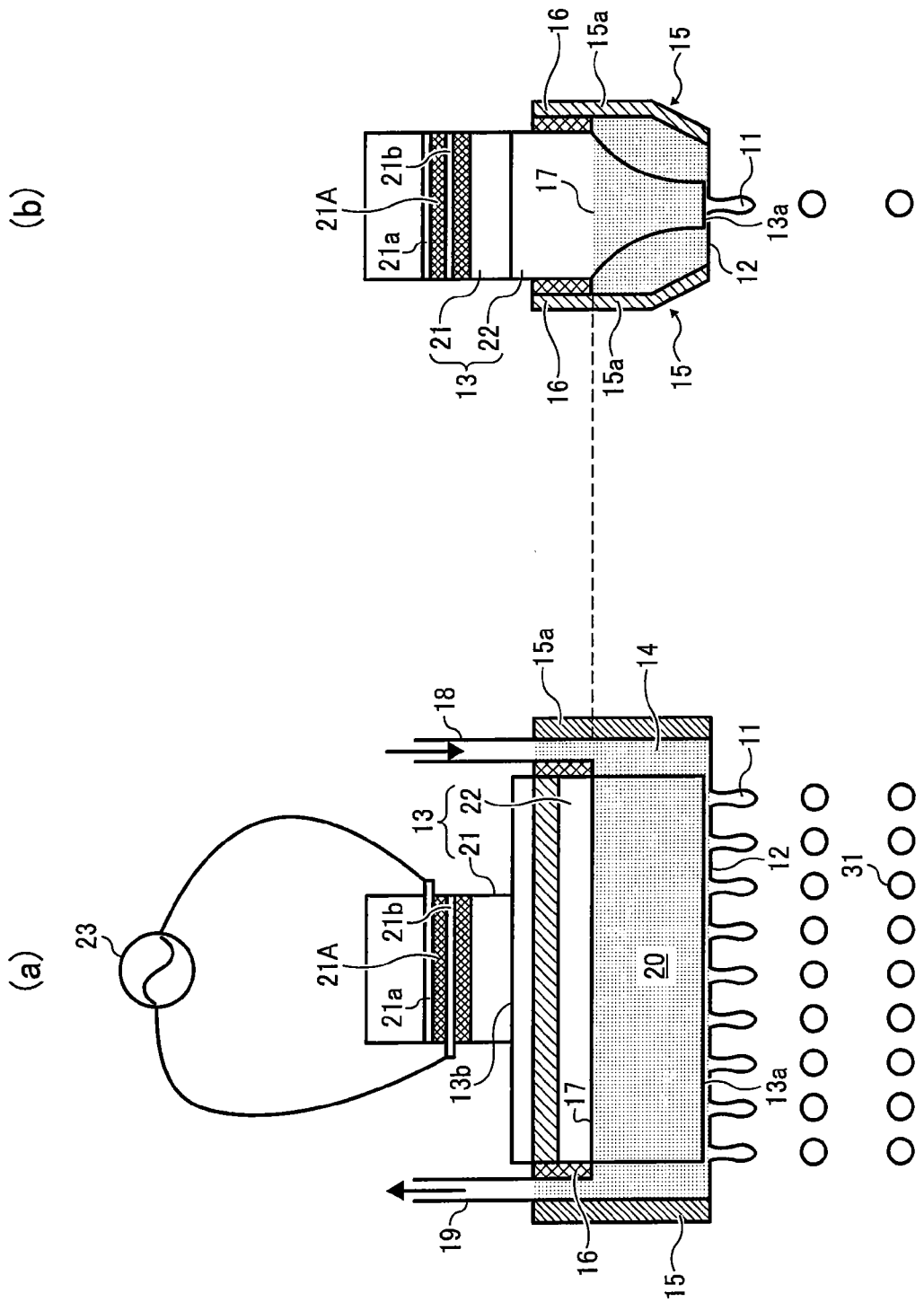

The droplet discharge unit 2 comprises a thin film 12, whereupon is formed a plurality of nozzles, i.e., discharge apertures, 11, an oscillation device 13, which imparts an oscillation upon the thin film 12, and a flow path material 15, which forms a storage portion, i.e., a solution flow path, 14, which supplies the toner composition solution 10 between the thin film 12 and the oscillation device 13; refer to FIG. 1 and FIG. 2. A configuration would be desirable wherein a location is anchored between the oscillation device 13 and a partition portion 15a of the flow path material 15, by a oscillation separation material 16, which is for preventing an oscillation being transmitted therebetween. It would also be permissible, however, for the oscillation device 13 to be directly anchored to the partition portion 15a by way of a small node 17 of an oscillation amplification of the oscillation device 13. The toner composition solution 10 is supplied to the storage portion 14 by way of a fluid supply pipe 18, which is connected to the fluid transfer tube 8. In addition, either an air bubble evacuation tube or a fluid circulation pump 19 is installed as necessary for evacuating an air bubble from the droplet discharge unit 2.

Description of Configuration of Thin Film 12

The thin film 12 is directly anchored to the flow path material 15 by way of a resin adhesion material, i.e., a bonding material, which does not dissolve in the toner composition solution 10. A quality of a material of the thin film 12 is formed from a rigid material. It would be possible to employ a material as the rigid material whereof the thin film 12 is formed that may be employed as a ceramic of a typical structure, such as a aluminum oxide, silicon carbide, or aluminum nitride. In addition, it would also be permissible instead to employ such as a composite material that is known as a hard metal alloy material, such as WX—Co.

Neither a size nor a shape of the nozzle 11 is particularly restricted, and it would thus be possible to select the size and the shape of the nozzle 11 as appropriate. It would be preferable, however, from a standpoint of causing a generation of a fine grain droplet comprising a uniform particle diameter when discharging the droplet of the toner composition solution 10, for an aperture diameter or the nozzle 11 to fall into a range of between 3 µm and 35 µm, when the thin film 12 comprises a thickness that falls into a range of between 10 µm and 500 µm, as an instance thereof. It is to be understood that an aperture diameter of the nozzle 11 refers to a diameter when the aperture of the nozzle 11 comprises a circle, and a minor axis when the aperture of the nozzle 11 comprises an ellipse.

Whereas a wide range of a processing apparatus would be conceivable as a nozzle processing apparatus, such as a masking reduction projecting processing technique that employs an excimer laser or an ultra short pulse laser, or a mechanical drill processing technique, would be preferred.

In addition, a quantity of the nozzle 11 with respect to a single unit of the oscillation device 13 falls into a range of between 1000 and 100,000 of the nozzle 11. It is to be understood that a more preferable quantity of the nozzle 11, from a standpoint of an operability according to the embodiment, would fall into a range of between 1000 and 10,000 of the nozzle 11.

Figure 11A:
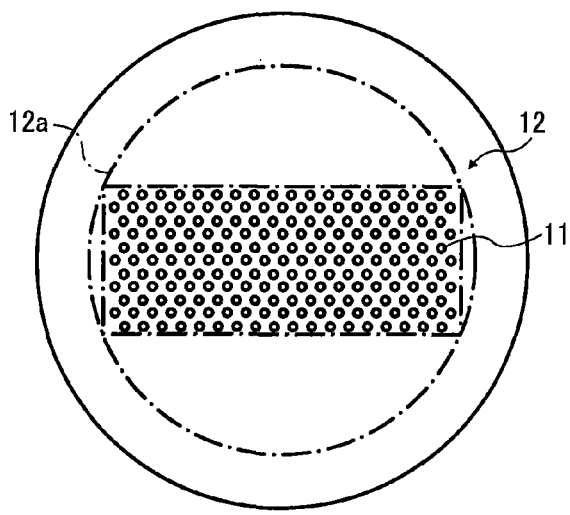
FIG. 11A is the plan view of the thin film.
Figure 11B:
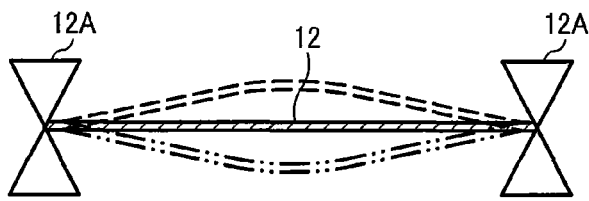
FIG. 11B is a schematic diagram that depicts an oscillation state of the thin film.
Figure 12:
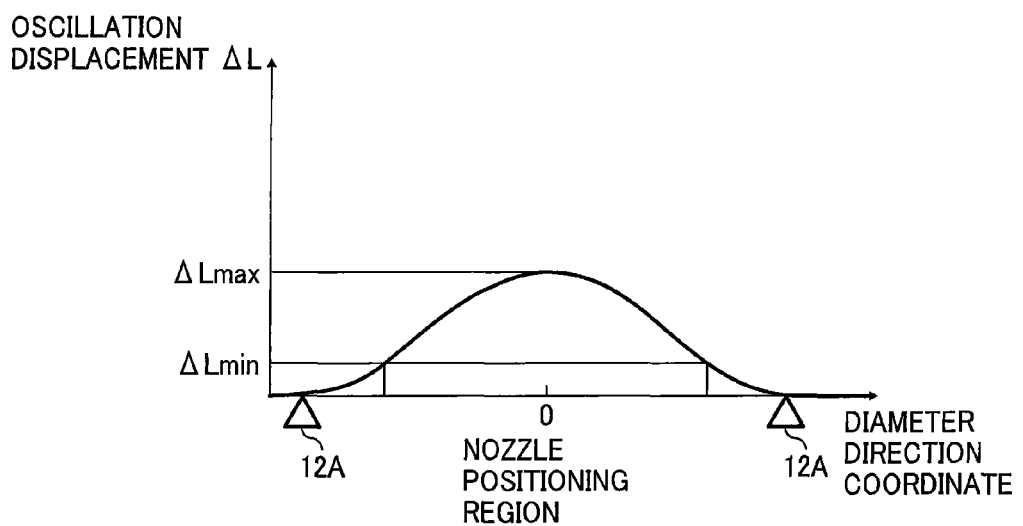
FIG. 12 is a diagram that depicts a baseline oscillation mode of the thin film.

The thin film 12 is configured to exhibit a regular circle shape, such as is depicted in FIG. 11A. In the present circumstance, a plurality of nozzles 11 are formed upon a surface that excludes a circumference portion 12A of the thin film 12, and a surface region of the thin film 12 aside from the circumference portion 12A of the thin film 12 that comprises a parallelogram shape, and that is opposite to an oscillation surface 13A (to be described hereinafter). When an oscillation is imparted upon the thin film 12, the thin film 12 oscillates, with the circumference portion 12A as a node of the thin film 12, such as is depicted in FIG. 11B. The oscillation comprises an oscillation mode wherein a node is not present in a direction of the diameter, such as is depicted in FIG. 12. It is to be understood that in FIG. 12, reference numeral ΔLmax denotes a maximum value of a displacement ΔL, and reference numeral ΔLmin denotes a minimum value of a displacement quantity that corresponds to a boundary region whereupon it is possible to position the nozzle 11. Given that the thin film 12 is configured from the rigid material, it is possible to reduce an oscillation displacement quantity of a higher order oscillation mode with respect to a high frequency band of the thin film 12, and, accordingly, it is possible to generate the droplet of the toner composition solution 10 in a stable manner even if the nozzle 11 is shaped upon a significant portion of A surface area of the thin film 12.

Description of Configuration of Oscillation Device 13

The oscillation device 13 is configured from an oscillation generating device 21, which generates an oscillation, and an oscillation amplification device 22, which amplifies the oscillation that is generated with the oscillation generating device 21. A drive circuit, i.e., a drive signal generating source, 23 is connected to the oscillation generating device 21.

A drive voltage, i.e., a drive signal, comprising a prescribed frequency, from the drive circuit 23 is impressed between an electrode 21A and 21B of the oscillation generating device 21, and the oscillation generating device 21 is excited to oscillate by the drive voltage, i.e., the drive signal, that is impressed thereupon. The oscillation that is thus generated is amplified with the oscillation amplification device 22, and the oscillation surface 13A, which is positioned in a parallel with the thin film 12, oscillates periodically. The toner composition solution 10 that is stored within the storage portion 14 is caused to periodically undergo a pressure fluctuation by way of the oscillation of the oscillation surface 13A.

Figure 3:
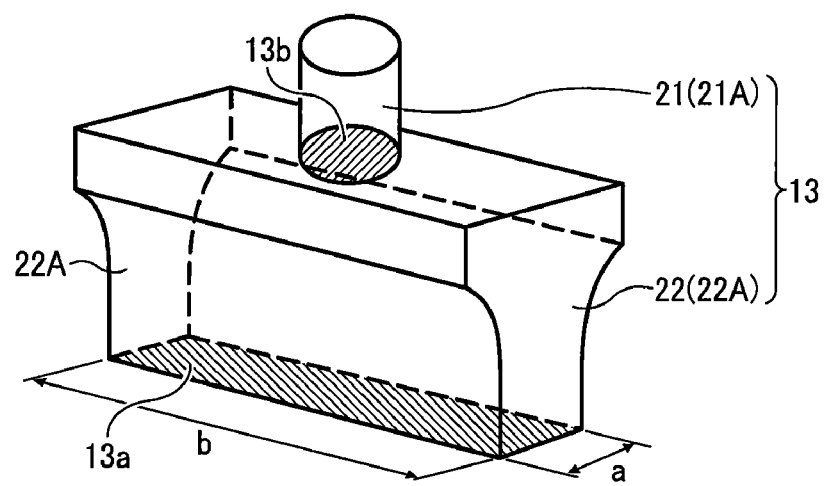
FIG. 3 is an oblique view that depicts an embodiment of an oscillation device that is depicted in FIG. 2.

In the present circumstance, the oscillation device 13 is formed such that a surface area of the oscillation surface 13A, which comprises a surface of an opposite side to a bonding surface 13B, which bonds the oscillation generating device 21 and the oscillation amplification device 22, is larger than a surface area of the bonding surface 13B, such as is depicted in FIG. 3. In addition, it is presumed that the oscillation surface 13A includes a parallelogram shape; in the present circumstance, a rectangle. In such a circumstance, the greater a ratio of a long side B to a short side A of the oscillation surface 13A, i.e., long side B: short side A, becomes, the greater an oscillation surface area thereupon becomes. Accordingly, it is preferable, from a standpoint of productivity, for the ratio long side B: short side A to be greater than 2.0.

The oscillation generating device 21 is configured from a piezoelectric body 21A. Whereas a piezoelectric ceramic exists as a configuration material of the piezoelectric body 21A, such as lead zirconate titanate (PZT), as an instance thereof, the piezoelectric ceramic is often used in a layered format, owing to a typically small displacement quantity thereof Another candidate material might be such as a piezoelectric high polymer, such as polyvinylidene fluoride (PVDF), or a single crystal, such as quartz, lithium niobate (LiNbO$_3$), lithium tantalate (LiTaO$_3$), or potassium niobate (KNbO$_3$).

A configuration for the oscillation generating device 21 would be permissible, provided that it is capable of imparting a reliable vertical oscillation at a given frequency upon the toner composition solution 10 that is stored within the storage portion 14. Accordingly, it would be possible to select and use the configuration of the oscillation generating device 21 as appropriate, with no particular restriction upon the selection of the configuration of the oscillation generating device 21. From a standpoint of exciting the oscillation surface 13A at a low voltage, however, it would be preferable to employ the piezoelectric body 21A for the oscillation generating device 21. It is to be understood that the piezoelectric body 21A comprises a function that converts an electrical energy into a mechanical energy.

Furthermore, it would be particularly preferable to employ a high strength oscillation element of a bolt tightening Langevin type for the oscillation generating device 21. A reason is that the oscillation element of the bolt tightening Langevin type is mechanically bonded to the piezoelectric body, and is thus resilient against a fracture when a highly amplified excitation takes place thereupon.

Description of Configuration of Oscillation Amplification Device 22

It is possible to employ a horn shaped oscillation amplification element for the oscillation amplification device 22, as an instance thereof. The horn shaped oscillation amplification element is capable of amplifying an amplitude of the oscillation generating device 21, which may comprise such as a piezoelectric element, with a horn 22A, as the oscillation amplification device 22, and, as a consequence thereof, it would be permissible for the oscillation generating device 21 proper, which generates a mechanical oscillation, to generate only a small oscillation thereupon, reducing a mechanical wear and tear upon the oscillation generating device 21, and thus extending an operating lifetime of the apparatus overall.

Figure 4:
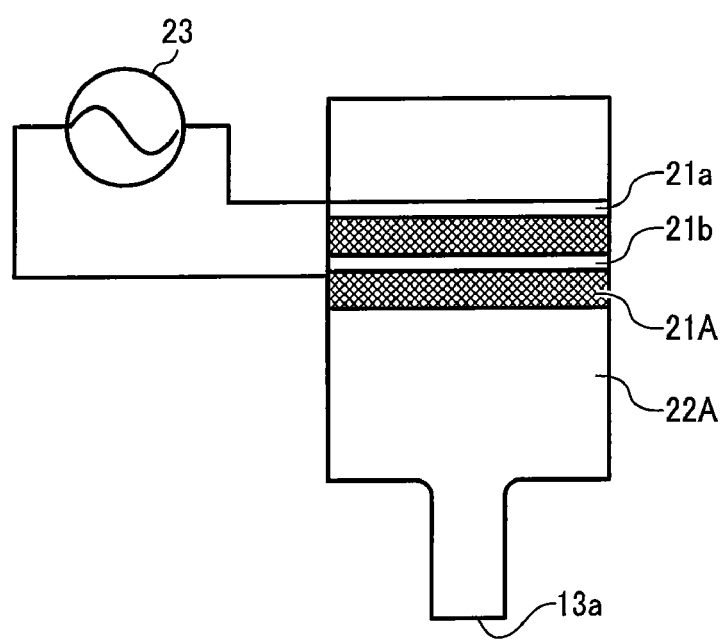
FIG. 4 is a front view that depicts another embodiment of the oscillation device that is depicted in FIG. 2.
Figure 5:
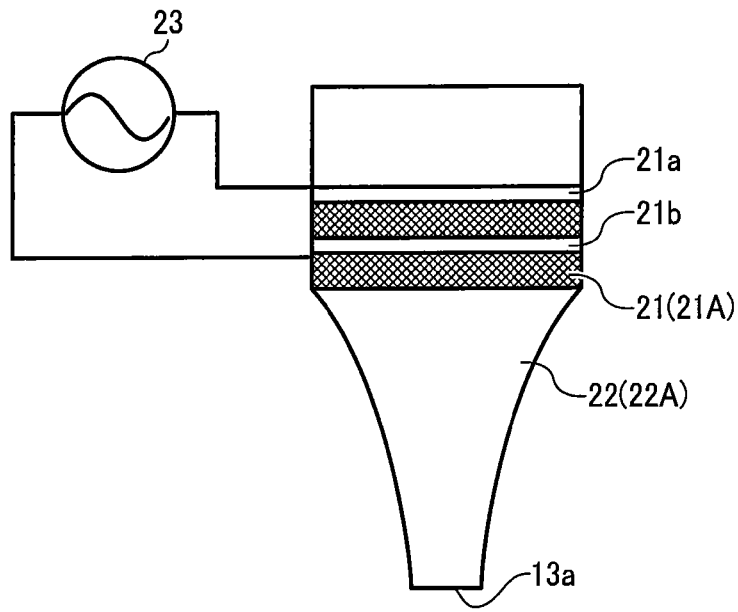
FIG. 5 is a front view that depicts still another embodiment of the oscillation device that is depicted in FIG. 2.
Figure 6:
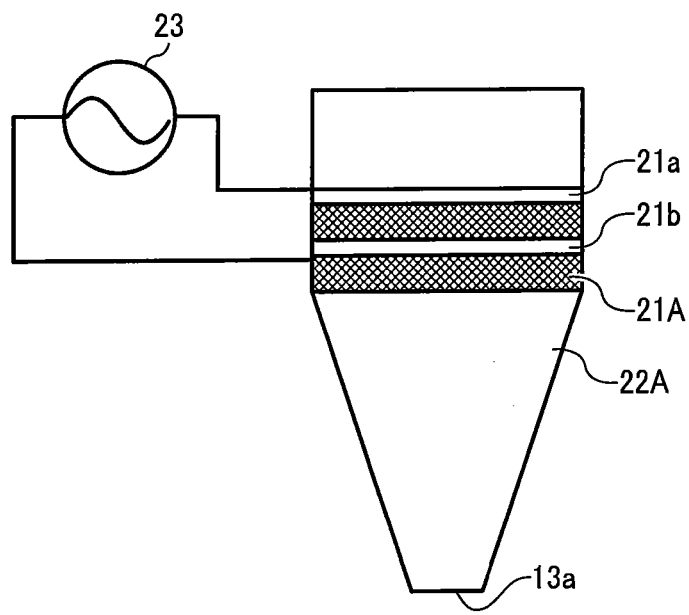
FIG. 6 is a front view that depicts still another embodiment of the oscillation device that is depicted in FIG. 2.

In the present circumstance, an established representative horn shape would be permissible as the horn shaped oscillation amplification element. The horn shape might comprise such as a step shape, such as is depicted in FIG. 4, an exponential shape, such as is depicted in FIG. 5, or a conical shape, such as is depicted in FIG. 6, as an instance thereof. The piezoelectric body 21A is positioned upon a side of the horn shaped oscillation amplification element thus depicted comprising a larger surface area of the horn 22A. The piezoelectric body 21A uses a vertical oscillation to induce an efficient oscillation upon the horn 22A. The horn shaped oscillation amplification element is designed such that a surface comprising a smaller surface area of the horn 22A is presumed to be the oscillation surface 13A, and the amplitude of the oscillation surface 13A comprises a maximum oscillation surface.

Description of Such As A Configuration of the Flow Path Material 15, and A Mounting Structure of the Droplet Discharge Unit 2

The fluid supply pipe 18, which supplies the toner composition solution to the storage portion 14, and the air bubble evacuation tube, or the fluid circulation pump 19 is connected to the flow path material 15 at one site thereupon, respectively, at a minimum.

The droplet discharge unit 2 is installed upon a ceiling portion of the particle forming portion 3, by way of a support material (not shown) that is mounted upon the flow path material 15. Whereas, in the present circumstance, the droplet discharge unit 2 is installed upon the ceiling portion of the particle forming portion 3, it is to be understood that it would also be possible to presume a configuration wherein the droplet discharge unit 2 is installed upon a surface partition of a desiccating portion side, or a lower portion, that configures the particle forming portion 3.

Figure 7:
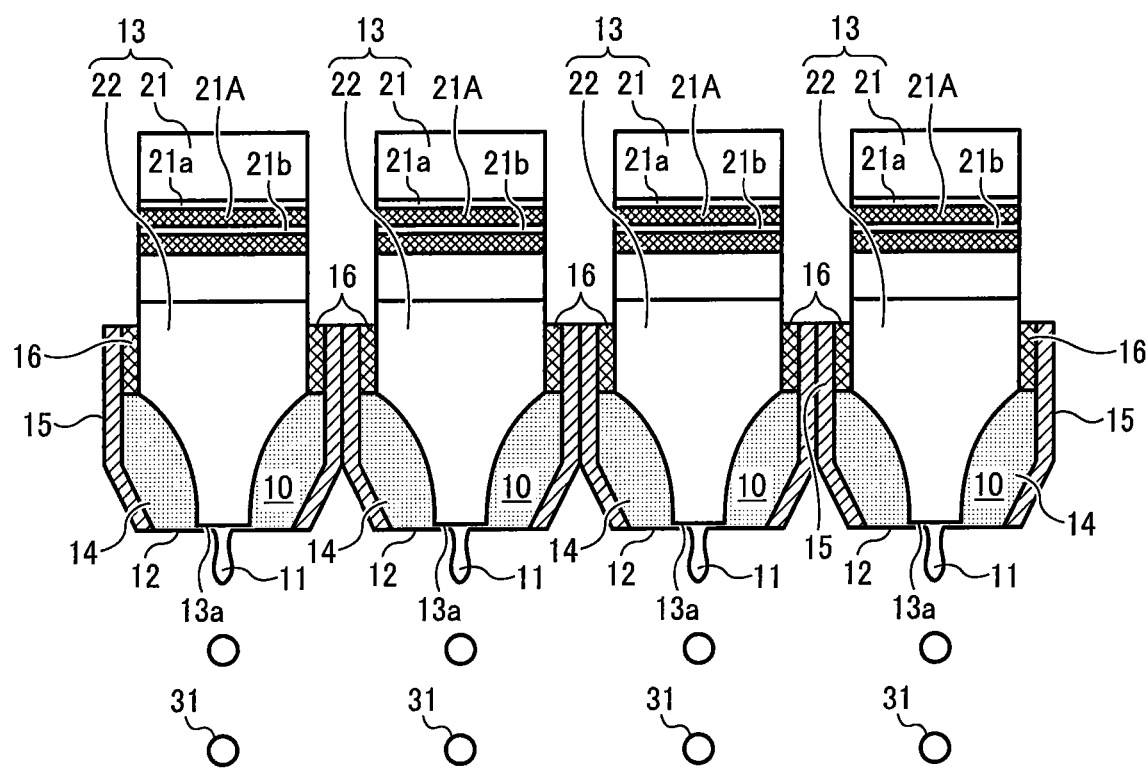
FIG. 7 is a cutaway view that depicts an assembly of the droplet forming unit that is depicted in FIG. 2.

Whereas the present description describes a circumstance wherein only one of the droplet discharge unit 2 is mounted upon the particle forming portion 3, it is to be understood that, from a standpoint of improving productivity, it would be preferable to install a plurality of droplet discharge units 2 in an array upon an upper portion of the particle forming portion 3, i.e., a desiccating tower, such as is depicted in FIG. 7. From a standpoint of a regulation of the droplet discharge unit 2, it would be preferable for the installed quantity of the droplet discharge unit 2 to fall into a range of between 1000 and 10,000 units. In such a circumstance, a configuration is presumed wherein each storage portion 14 of the droplet discharge unit 2 is linked to the raw material housing portion 7 by way of each respective pipe 8, and the toner composition solution 10 is supplied to each storage portion 14 thereby. In such a circumstance, it would be possible to presume a configuration wherein the toner composition solution 10 is supplied in a self-feeding manner as the toner composition solution 10 is formed into the droplet. In addition, it would also be permissible to employ the pump 9 to perform the supply of the solution in a supplemental manner in a circumstance such as when the toner manufacturing device 1 is initially activated.

Description of Mechanism of Forming of Droplet

Following is a description of a mechanism of forming the droplet by way of the droplet discharge unit 2, with reference to FIG. 8. An oscillation that is generated upon the oscillation surface 13A by the oscillation device is transmitted to the toner composition solution 10 that is contained within the storage portion 14, and arrives at the thin film 12 as a sound wave. The toner composition solution 10 is pressurized and discharged from the plurality of nozzles 11 that is installed upon the thin film 12, toward a gaseous medium. In the present circumstance, the sound wave that propagates within the storage portion 14 also affects the thin film 12, and, as a consequence thereof, the thin film 12 oscillates with a phase delay with respect to the oscillation device. A plurality of dispersed fine grains that are contained within the toner composition solution 10 is prevented from settling upon a surface of a side of the thin film 12 that is toward the storage portion 14 by way of the effect of the oscillation upon the thin film 12. The dispersed fine grains are suspended within the storage portion 14 by way of the effect of the oscillation upon the thin film 12, and, as a consequence thereof, the toner composition solution 10 is discharged in a stable manner from the nozzle 11.

Given that the thin film 12 is formed from the rigid material, the oscillation of the thin film 12 results in an even, homogenous oscillation mode, allowing the nozzle 11 to be positioned upon a totality of a level oscillation region. As a result, it is possible to form a large quantity of the droplet with a single oscillation unit and at a common timing, allowing a significant improvement in the efficiency of the generation of the droplet thereby.

It is to be understood that, in FIG. 8, FIG. 8A illustrates a state of the droplet discharge unit 2 prior to the discharge of the droplet, FIG. 8B illustrates a state of the droplet discharge unit 2 subsequent to the discharge of the droplet, and FIG. 8C is a graph that denotes a phase relationship between an oscillation waveform of the oscillation amplification device 22 and an oscillation waveform of the thin film 12.

Description of Particle Forming Portion 3

Following is a description of the particle forming portion 3, which solidifies a droplet 31 of the toner composition solution 10 and forms the toner particle T thereby, with reference to FIG. 1. In the present circumstance, a solution or dispersal is employed as the toner composition solution 10, wherein a toner composition substance, comprising, at a minimum, a resin and a coloring agent, is dissolved or dispersed in a solvent, and the toner particle T is formed by desiccating and solidifying the droplet 31. In summary, according to the embodiment, the particle forming portion 3 is presumed to be a solvent removal portion, which forms the toner particle T by desiccating and removing the solvent from the droplet 31; hereinafter, the particle forming portion 3 will also be interchangeably referred to as either a "solvent removal portion" or a "desiccating tower storage portion."

Put another way, the particle forming portion 3 removes the solvent from the droplet 31 and forms the toner particle T, by conveying the droplet 31 that is discharged from the plurality of nozzles 11 of the droplet discharge unit 2 by way of a desiccating gaseous body 35 that flows in a direction that is identical to a direction of a flight of the droplet 31. It is to be understood that the desiccating gaseous body 35 refers to a gas that is in a state wherein a dew point of the gas is less than or equal to −10 degrees C. at standard atmospheric pressure. It would be permissible for the desiccating gaseous body 35 to comprise any gas that would be capable of desiccating the droplet 31, allowing an employment as the desiccating gaseous body 35 such as air or nitrogen gas, as an instance thereof.

Description of Toner Collection Portion 4

Following is a description of the toner collection portion 4. The toner collection portion 4 is installed sequentially upon the particle forming portion 3, in a downstream portion of the direction of a flight of a particle upon the particle forming portion 3. The toner collection portion 4 comprises a tapering surface 41, wherein an aperture diameter of the toner collection portion 4 gradually narrows from an intake side, i.e., the side that is nearer to the droplet discharge unit 2, to an outflow side. An air stream 42, which is, for example, a vortex, is generated within the toner collection portion 4 by way of a suction that is caused by such as a suction pump (not shown), upon a downstream side of the toner collection portion 4, as an instance thereof. The toner particle T is collected by way of the air stream 42 that is thus generated within the toner collection portion 4. Given that the air stream 42 is a vortex, a centrifugal force occurs, whereby the toner particle T is reliably collected, and transferred to the toner storage portion 6 that is upon a downstream side of the toner collection 4.

The toner particle T that is collected with the toner collection portion 4 is transferred to the toner storage portion 6, via the tube 5, by way of the air stream 42, and is stored within the toner storage portion 6. It would be preferable to ground the toner collection portion 4, the tube 5, and the toner storage portion 6 when forming these components from a conductive material. In addition, it would be preferable for the toner manufacturing device 1 overall to comprise an explosion protected specification. It is to be understood that it would also be possible to presume a either a configuration that pumps the toner particle T from the toner collection portion 4 to the toner storage portion 6, or a configuration that sucks the toner particle T into the toner storage portion 6 from the toner storage portion 6 side.

Description of Method of Manufacturing the Toner Particle T

Following is a description of an overview of a method of manufacturing the toner with the device for manufacturing the toner 1 of a configuration such as is described herein. In a state wherein the toner composition solution 10, wherein a toner composition substance, comprising, at a minimum, a resin and a coloring agent, is dissolved or dispersed in a solvent, is supplied to the storage portion 14 of the droplet discharge unit 2, a drive signal is impressed upon the oscillation generating device 21 at a prescribed drive frequency. An oscillation arises within the oscillation generating device 21 as a result of the drive signal being impressed thereupon, the oscillation that thus arises is amplified by the oscillation amplification device 22, and the toner composition solution 10 that is contained within the storage portion 14 is excited by the oscillation thus amplified.

The oscillation of the oscillation surface 13A of the oscillation device 13 is propagated to the toner composition solution 10 that is stored within the storage portion 14, a periodic pressure fluctuation arises within the toner composition solution 10 that is stored within the storage portion 14, and, as a result, when pressurized, the toner composition solution 10 is periodically formed into the droplet and discharged as the droplet 31 from the plurality of nozzles 11 into the particle forming portion, i.e., the solvent removal portion, 3; refer to FIG. 1 for particulars.

Thereafter, the droplet 31 that is thus discharged into the particle forming portion 3 is conveyed by way of the desiccating gaseous body 35 that flows in the direction that is identical to the direction of the flight of the droplet 31. As a result, the solvent is removed and the toner particle T is formed. The toner particle T that is thus formed by the particle forming portion 3 is collected by the air stream 42 within the toner collection portion 4 that is upon a downstream side of the particle forming portion 3, and upon collection thereby, the toner particle T is sent to the toner storage portion 6 for storage therein, by way of the tube 5.

Thus, the plurality of nozzles 11 are installed upon the droplet discharge unit 2, and a plurality of the droplets 31 of the toner composition solution 10 that are formed into the droplets simultaneously are discharged continuously and in a plurality, thereby dramatically improving the efficiency of the manufacture of the toner. In addition, the oscillation device 13 is configured of the oscillation generating device 21 and the oscillation amplification device 22, allowing obtaining a comparatively large oscillation with a low electric current.

By positioning the plurality of the nozzles 11 upon the region of the oscillation surface of the thin film 12, it becomes possible to discharge a plurality of the droplets 31 all at once. Furthermore, the settling of the dispersed fine grain particles that are present within the toner composition solution 10 is prevented by the excitation of the thin film 12, allowing the toner to be manufactured in a stable and efficient manner, with no clogging arising within the nozzle 11. It has been verified that the toner that is obtained by the toner manufacturing method described herein comprises a unified dispersal of the particle size that has heretofore been impossible to achieve.

Whereas, according to the embodiment, the droplet is generated by the toner composition solution 10 wherein the toner composition substance, comprising, at a minimum, the resin and the coloring agent, is dissolved or dispersed in the solvent, the organic solvent that is included within the droplet that is generated by the toner composition 10 thereupon is vaporized and desiccated by a desiccation gaseous body within the solvent removal portion, the shrinkage and solidifying of the droplet thereby forming the toner particle T, it is to be understood that the formation of the toner particle T is not limited to the description provided herein.

As an instance thereof, it would also be possible to generate the toner composition solution 10 by dissolving the toner composition material within a heated storage portion 14, thereby liquefying the toner composition material, to discharge and emit the toner composition solution 10 as the droplet, and thereafter to solidify the droplet 31 thus discharged by cooling, thereby forming the toner particle T. In addition, it would also be possible to use the toner composition solution 10 that includes a thermosetting material to form the toner particle T by solidifying the droplet by way of a hardening reaction that is triggered by applying heat to the droplet, after the toner composition solution 10 is discharged as the droplet.

Description of Other Method of Manufacturing of Toner Particle T

Figure 9:
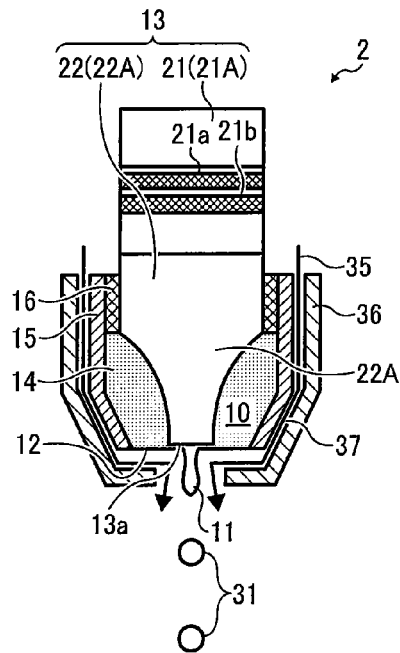
FIG. 9 is a cutaway view of another embodiment of a droplet discharge unit that is depicted in FIG. 2.
Figure 10:
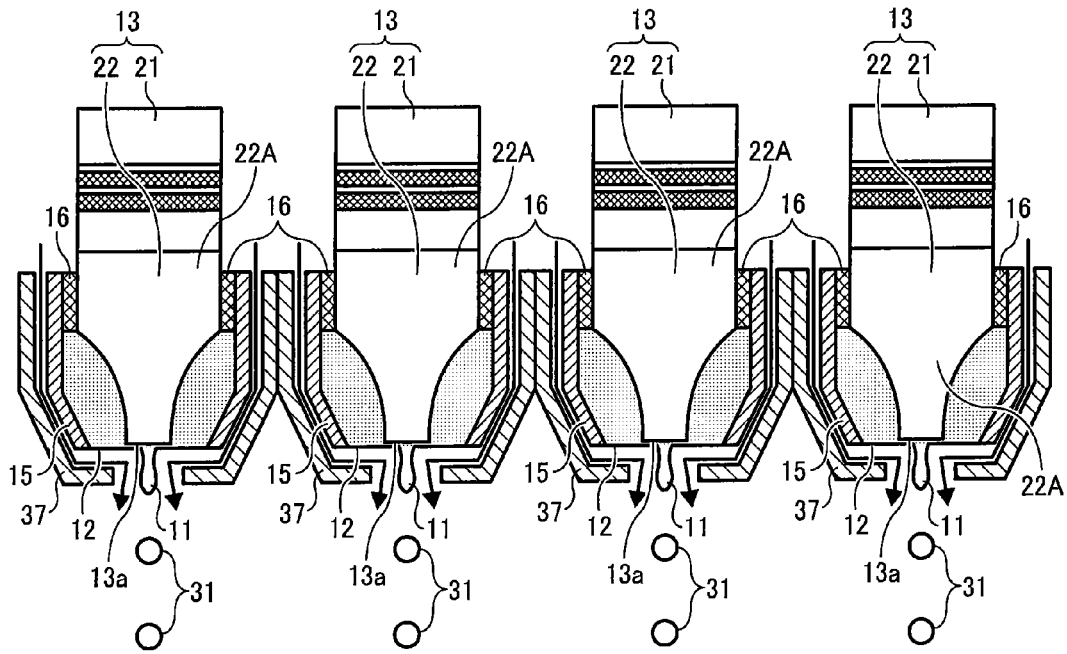
FIG. 10 is a cutaway view of an assembly of a droplet forming unit that is depicted in FIG. 9.

FIG. 9 describes a method of manufacturing the toner particle T, wherein an air stream path, which supplies an air stream for dispersal of a droplet, is installed within the droplet discharge unit 2. The droplet discharge unit 2 employs the horn shaped oscillation amplification element within the oscillation device 13. The flow path material 15, which supplies the toner composition solution 10, is positioned so as to surround a circumference of the oscillation generation device 13. The storage portion 14 is formed within the flow path material 15, including the oscillation surface 13A that is in opposition to the thin film 12 of the horn 22A of the oscillation generation device 13. An air stream path forming material 36 is positioned upon a circumference of the flow path material 15, with an interstice opened upon the air stream path forming material 36 as appropriate. The air stream path forming material 36 is configured to form an air stream path 37, which directs the air stream 35, in collaboration with the flow path material 15. Whereas one of the nozzles 11 is depicted upon the thin film 12 in FIG. 9, in order to simplify the drawing thereof, it is to be understood that it would also be permissible to install a plurality of nozzles 11 upon the thin film 12. In addition, it would be possible, to presume a configuration, such as is depicted in FIG. 10, wherein an assembly body is formed combining a plurality of the droplet units 2, whereupon the air stream path 37 is in turn installed, such as is depicted in FIG. 9, and the assembly body is installed upon a ceiling portion of the particle forming portion 3, thus achieving an improvement in productivity of the manufacture of the toner. From a regulatory standpoint, it would be preferable to position, as an instance thereof, between 1000 and 10,000 droplet discharge units 2 in a linear array upon a ceiling portion of a desiccation tower storage portion that configures the particle forming portion 3. Doing so allows achieving a further improvement in the productivity of the manufacture of the toner.

Description of Toner T

Following is a description of the toner T according to the present invention. The toner T is a toner that is manufactured by the toner manufacturing method that employs the toner manufacturing device 1. It is possible to obtain, by way of the toner manufacturing device 1, a toner T that includes a uniform dispersal of a particle size distribution thereupon. It is preferable for the particle size distribution of the toner T, i.e., a weight-average particle diameter over a number-average particle diameter, to fall within a range of between 1.00 and 1.05. In addition, it would be preferable for the weight-average particle diameter to fall into a range of between 1 μm and 20 μm.

Toner Material

Following is a description of a toner material, i.e., a toner composition solution, that is used according to the present invention.

It would be possible to use a substance for the toner material according to the present invention that is exactly the same substance as is used in a conventional electrophotographic toner. Put another way, it would be possible to produce the toner particle that is an object of the manufacturing process by dissolving, within various types of organic solvent, a toner binder, such as a styrene acrylic resin, a polyester resin, a polyol resin, or an epoxy resin, either dispersing or dissolving a coloring agent with a dispersal agent or a release agent, and desiccating and solidifying the resulting solution as a microscopic droplet, with a toner manufacturing method. In addition, it would also be possible to produce the toner particle that is an object of the manufacturing process by first dissolving or dispersing, within various types of organic solvent, a mixture that is obtained by heating, melting, and mixing the material, and desiccating and solidifying the resulting solution as a microscopic droplet, with a toner manufacturing method.

Toner Material

At least, a material comprising a resin and a coloring agent is employed as the toner material, and the material may further include another substance, such as a carrier or a wax, as necessary.

Resin

A binding resin is employed as a resin, at a minimum. No particular restriction is applied to the binding resin that may be employed as the resin, and it would thus be possible to select and use a normally used resin as appropriate. As an instance thereof, the binding resin may comprise such as a vinyl polymer, which may be such as a styrene monomer, an acrylic monomer, or a methacrylamide monomer, a copolymer that is formed from two or more of the monomers, a polyester polymer, a polyol resin, a phenol resin, a silicon resin, a polyurethane resin, a polyamide resin, a furan resin, an epoxy resin, a xylene resin, a terpene resin, a coumarone indene resin, a polycarbonate resin, or a petroleum resin.

As an instance of the styrene monomer, a styrene such as styrene, o-methyl styrene, m-methyl styrene, p-methyl styrene, p-phenyl styrene, p-ethyl styrene, 2,4-dimethyl styrene, p-n-amyl styrene, p-tert-butyl styrene, p-n-hexylstyrene, p-n-octylstyrene, p-n-nonylstyrene, p-n-decylstyrene, p-n-dodecylstyrene, p -methoxystyrene, p-chlorstyrene, 3,4-dichlorostyrene, m-nitrostyrene, o-nitrostyrene, or p-nitrostyrene, or such as a derivative thereof, might be employed.

As an instance of the acrylic monomer, an acrylic acid such as acrylic acid, or methyl acrylate, ethyl acrylate, propyl acrylate, n-butyl acrylate, isobutyl acrylate, n-octyl acrylate, n-dodecyl acrylate, 2-ethylhexyl acrylate, stearyl acrylate, 2-chlorethyl acrylate, or phenyl acrylate, or such as an ester thereof, might be employed.

As an instance of the methacrylamide monomer, a methacrylic acid such as methacrylic acid, methyl methacrylamide, ethyl methacrylamide, propyl methacrylamide, n-butyl methacrylamide, isobutyl methacrylamide, n-octyl methacrylamide, n-dodecyl methacrylamide, 2-ethylhexyl methacrylamide, stearyl methacrylamide, phenyl methacrylamide, dimethyl amino ethyl methacrylamide, or diethyl amino ethyl methacrylamide, or such as an ester thereof, might be employed.

As an instance of the vinyl polymer or of another monomer that forms a copolymer, any of 1 to 18, hereinafter, may be employed:

1. A monoolefin, such as ethylene, propylene, butylene, or isobutylene;

2. A polyene, such as butadiene or isoprene;

3. A vinyl halide, such as vinyl chloride, vinylidene chloride, vinyl bromide or vinyl fluoride;

4. A vinyl ester, such as vinyl acetate, vinyl propionate, or vinyl benzoate;

5. A vinyl ether, such as vinyl methyl ether, vinyl ethyl ether, or vinyl isobutyl ether;

6. An N-vinyl compound, such as vinylmethyl ketone, vinylhexyl ketone, or methylisopropenyl ketone;

7. An N-vinyl compound, such as N-vinyl pyrrole, N-vinyl carbazole, N-vinyl indole, or N-vinyl pyrrolidone;

8. A vinyl napthalene;

9. An acrylate or a methacrylate, such as acrylonitrile, methacrylonitrile, or acrylaimide;

10. An unsaturated dibasic acid, such as maleic acid, citraconic acid, itaconic acid, dodecenyl succinic, fumaric acid, or mesaconic acid;

11. An unsaturated dibasic acid anhydride, such as maleic acid anhydride, citraconic acid anhydride, itaconic acid anhydride, or dodecenyl succinic anhydride;

12. An unsaturated dibasic acid monoester, such as maleic acid monomethyl ester, maleic acid monoethyl ester, maleic acid monobutyl ester, citraconic acid monomethyl ester, citraconic acid monoethyl ester, citraconic acid monobutyl ester, itaconic acid monomethyl ester, dodecenyl succinic monomethyl ester, fumaric acid monomethyl ester, or mesaconic acid monomethyl ester;

13. An unsaturated dibasic acid ester, such as dimethyl maleic acid or dimethyl fumaric acid;

14. An $\alpha$, $\beta$-unsaturated acid, such as krotonic acid or cinnamic acid;

15. An $\alpha$, $\beta$-unsaturated acid anhydride, such as krotonic acid anhydride or cinnamic acid anhydride;

16. A monomer comprising a carboxyl group, such as an anhydride of the $\alpha$, $\beta$-unsaturated acid and a lower fatty acid, alkenyl malonate, alkenyl glutarate, or alkenyl adipate, as well the anhydrides thereof, and the monoesters thereof;

17. An acrylate or methacrylamide hydroxyalkyl ester, such as 2-hydroxyethyl acrylate, 2-hydroxyethyl methacrylate, or 2-hydroxypropyl methacrylate; or 18. A monomer comprising a hydroxy group, such as 4-(1-hydroxy-1-methylbutyl) styrene or 4-(1-hydroxy-1-methylhexyl) styrene;

With the toner T according to the present invention, it would also be permissible for the vinyl polymer or copolymer of the binding resin to comprise a bridged structure that is cross-linked with a cross linker that further comprises two or more vinyl bases. As the cross linker that is employed in such a circumstance, as an instance of an aromatic divinyl compound thereof, such as divinyl benzene or divinyl naphthalene may be employed. As an instance of a diacrylate compound that is connected with an alkyl chain, such as ethylene glycol diacrylate, 1,3-butylene glycol diacrylate, 1,4-butane diol diacrylate, 1,5-pentane diol diacrylate, 1,6 hexane diol diacrylate, or neopentyl glycol diacrylate, as well as a substitution of methacrylate for acrylate in the compounds thus listed, may be employed. As an instance of a diacrylate compound that includes an ether bond and is connected with an alkyl chain, such as diethylene glycol diacrylate, triethylene glycol diacrylate, tetraethylene glycol diacrylate, polyethylene glycol #400 diacrylate, polyethylene glycol #600 diacrylate, or dipropylene glycol diacrylate, as well as a substitution of methacrylate for acrylate in the compounds thus listed, may be employed.

Another compound that may be employed according to the invention would be an acrylate compound or dimethacrylate compound that is linked by a chain that includes an aromatic base and an ether bond. As an instance of a polyester diacrylate, it would be possible to employ a product named Manda, manufactured by Nippon Kayaku Co., Ltd.

As a polyfunctional cross linker, it would be possible to employ pentaerythritol triacrylate, trimethyrol ethane triacrylate, trimethyrol propane triacrylate, tetramethyrol methane tetraacrylate, or oligoester acrylate, as well as a substitution of methacrylate for acrylate in the compounds thus listed, in addition to triallyl cyanurate or triallyl trimellitate, may be employed.

For the cross linkers described herein, it is preferable to employ between 0.01 parts and 10 parts with respect to 100 parts of another monomer component, with the cross linkers between 0.03 parts and 5 parts being particularly preferable. A suitable compound from among the cross-linked monomers described herein, from a standpoint of an ability to fix to the toner resin and a resilience to offset, would be an aromatic divinyl compound, especially divinyl benzene, or a diacrylate compound that is linked with a bond chain that includes an aromatic base and an ether bond. A combination of the monomers from among the monomers described herein that form such as a styrene copolymer or a styrene-acrylic copolymer would be preferable.

As an instance of a polymerization initiator that is employed in the manufacture of either the vinyl polymer or the copolymer according to the present invention, such as 2,2'-azobisisobutyronitrile, 2,2'-azobis(4-methoxy-2, 4-dimethyl valeronitrile, 2,2'-azobis (2,4-dimethyl valeronitrile), 2,2'-azobis(2-methyl butyronitrile), dimethyl-2,2'-azobisisobutylate, 1,1'-azobis(1-cyclohexane carbonitrile), 2-(azocarboxamide)-isobutyronitrile, 2,2'-azobis(2, 4,4-trimethyl pentane), 2-phenylazo-2',4-dimethyl-4'-methoxy valeronitrile, 2, 2'-azobis(2-methylpropane), a ketone peroxide such as methylethyl ketone peroxide, acetyl acetone peroxide, or cyclohexanone peroxide, 2,2-bis(tert-butylperoxy)butane, tert-butyl hydroperoxide, cumene hydroperoxide, 1,1,3, 3-tetramethylbutyl hydroperoxide, di-tert-butyl peroxide, tert-butyl cumyl peroxide, di-cumyl peroxide, α-(tert-butylperoxy)isopropyl benzene, isobutyl peroxide, octanoyl peroxide, decanoyl peroxide, lauroyl peroxide, 3,5,5-trimethyl hexanoyl peroxide, benzoyl peroxide, m-tolyl peroxide, di-isopropylperoxy dicarbonate, di-2-ethylhexylperoxy dicarbonate, di-n-propylperoxy dicarbonate, di-2-ethoxyethylperoxy carbonate, di-ethoxyisopropylperoxy dicarbonate, di(3-methyl-3-methoxybutyl)peroxy carbonate, acetylcyclohexyl sulfonyl peroxide, tert-butylperoxy acetate, tert-butylperoxyisobutylate, tert-butylperoxy-2-ethyl hexylate, tert-butylperoxy laorate, tert-butyl-oxybenzoate, tert-butylperoxyisopropyl carbonate, di-tert-butylperoxyisophthalate, tert-butylperoxyallyl carbonate, isoamylperoxy-2-ethyl hexanoate, di-tert-butylperoxyhexahydro terephthalate, or tert-butylperoxy azelate may be employed herein.

When the binding resin is a styrene-acrylic resin, it would be preferable, from a standpoint of an ability to fix, a resilience, to an offset, and a shelf life, for the resin to comprise a molecular weight distribution by way of GPC, which is capable of being solubilized within a tetrahydrofuran (THF) resin component, wherein a single peak, at a minimum, is present within a region of a molecular weight of between 3000 and 50,000, by number average molecular weight conversion, and that a single peak, at a minimum, is present within a region of a molecular weight that is greater than or equal to 100,000. In addition, it would be preferable, as the component that is soluble within the THF, to comprise a binding resin that comprises between 50% and 90% wherein the molecular weight distribution is less than or equal to 100,000, it would be more preferable herein, as the component that is soluble within the THF, to comprise a binding resin that comprises a main peak within a region wherein the molecular weight falls between 5000 and 30,000, and it would be most preferable as the component that is soluble within the THF, to comprise a binding resin that comprises a main peak within a region wherein the molecular weight falls between 5000 and 20,000.

As an acid value when the binding resin comprises a vinyl polymer, such as a styrene-acrylic resin, it would be preferable to fall into a range of between 0.1 mg KOH/g and 100 mg KOH/g, with a range of between 0.1 mg KOH/g and 70 mg KOH/g being more preferable thereupon, and a range of between 0.1 mg KOH/g and 50 mg KOH/g being most preferable thereupon.

As the monomer that configures the polyester polymer, it would be possible to cite the monomers that are described hereinafter.

It would be possible to cite, as an instance of a two-value alcohol element, such as ethylene glycol, propylene glycol, 1,3-butane diol, 1,4-butane diol, 2, 3-butane diol, diethylene glycol, triethylene glycol, 1,5-pentane diol, 1,6-hexane diol, neopentyl glycol, 2-ethyl-1,3-hexane diol, hydrogenated bisphenol A, or such as a diol that is obtained by compounding a cyclic ether, such as ethylene oxide or propylene oxide with hydrogenated bisphenol A or bisphenol A.

It would be preferable to combine the 2-value alcohol with a 3 or higher value alcohol in order to cause the polyester resin to form the cross linkage.

As the polyvalent alcohol of value 3 or more, it would be possible to cite such as sorbitol, 1,2,3,6-hexane tetrol, 1,4-sorbitane, pentaerythritol, an instance thereof being dipentaerythritol or tripentaerythritol, 1,2,4-butane triol, 1,2,5-pentatriol, glycerol, 2-methylpropane triol, 2-methyl-1,2,4-butane triol, trimethyrol ethane, trimethyrol propane, or 1,3, 5-trihydroxy benzene.

As an instance of the acid component that forms the polyester polymer, it would be possible to cite such as a benzene dicarbonate such as phthalic acid, isophthalic acid, or terephthalic acid, as well as the anhydrides thereof, an alkyl dicarbonate such as succinic acid, adipic acid, sebacic acid, or azelaic acid, as well as the anhydrides thereof, an unsaturated dibasic acid, such as maleic acid, citraconic acid, itaconic acid, dodecenyl succinic, fumaric acid, or mesaconic acid, as well as an unsaturated dibasic acid anhydride, such as maleic acid anhydride, citraconic acid anhydride, itaconic acid anhydride, or dodecenyl succinic anhydride. In addition, it would be possible to cite, as the polyvalent carbonic acid component with a value of 3 or more, such as trimellitic acid, pyromellitic acid, 1,2,4-benzene tricarbonate, 1,2,5-benzene tricarbonate, 2,5,7-naphthalene tricarbonate, 1,2, 4-naphthalene tricarbonate, 1,2,4-butane tricarbonate, 1,2,5-hexane tricarbonate, 1,3-dicarboxy-2-methyl-2-methylene carboxy propane, tetra (methylene carboxy)methane, 1,2,7,8-octane tetracarbonate, or EnPol trimer, in addition to the anhydrides or partial lower alkyl esters thereof.

When the binding resin is the polyester resin, it would be preferable, from a standpoint of an ability to fix, a resilience to an offset, and a shelf life, for the resin to comprise a molecular weight distribution, which is capable of being solubilized within a tetrahydrofuran (THF) resin component, wherein a single peak, at a minimum, is present within a region of a molecular weight of between 3000 and 50,000, and that, in addition, it would be preferable, as the component that is soluble within the THF, to comprise a binding resin that comprises between 60% and 100% wherein the molecular weight distribution is less than or equal to 100,000, it would be more preferable herein, as the component that is soluble within the THF, to comprise a binding resin that comprises a main peak within a region wherein the molecular weight falls between 5000 and 30,000, and it would be more preferable still as the component that is soluble within the THF, to comprise a binding resin that comprises a main peak within a region wherein the molecular weight falls between 5000 and 20,000.

As an acid value when the binding resin comprises a polyester resin, it would be preferable to fall into a range of between 0.1 mg KOH/g and 100 mg KOH/g, with a range of between 0.1 mg KOH/g and 70 mg KOH/g being more preferable thereupon, and a range of between 0.1 mg KOH/g and 50 mg KOH/g being most preferable thereupon.

According to the present invention, the molecular weight distribution of the binding resin is measured by gel permeation chromatography (GPC) wherein the THF is presumed to be the solvent.

As the binding resin that is capable of being used in the toner according to the present invention, it would also be possible to use, from among a binding resin that comprises either or both of a vinyl polymer component or a polyester resin component, at a minimum, a resin that includes a monomer component that is capable of reacting with both of the resin components described herein. As an instance of a monomer, from among the monomers that configure the polyester resin component, that is capable of reacting with the vinyl polymer, it would be possible to cite such as an unsaturated dicarbonate, such as phthalic acid, maleic acid citraconic acid, or itaconic acid, as well as the anhydrides thereof. As the monomer that configures the vinyl polymer component, it would be possible to cite a group that comprises either a carboxyl group or a hydroxy group, as well as an acrylic acid or a methacrylamide acid ester.

In addition, when a polyester polymer and a vinyl polymer is combined with another binding resin, it would be preferable for the acid value of the binding resin overall to fall into a range of between 0.1 mg KOH/g and 50 mg KOH/g, comprising a molecular weight of greater than or equal to 60%.

According to the present invention, the acid value of the binding resin component of the toner composition material is derived by a method that is described hereinafter. An operation thereof is performed in accordance with JIS K-0070, except where otherwise specified.

1. Either prepare the material to be examined by either removing an additive other than the binding resin, i.e., the polymer component, or obtain the acid value and a weight by component of the component other than the binding resin and the cross linked binding resin prior to commencement. An amount of a powdered form of the material to be examined of between 0.5 g and 2.0 g is precisely weighed, and a weight of the polymer component of the material thus weighed is treated as "Wg." As an instance thereof, when measuring the acid value of the binding resin from the toner, the acid value and the weight by component of such as the coloring agent or the magnetic body is measured separately from one another, and the acid value of the binding resin derived by taking the total of the acid values of the components of the binding resin.

2. The material to be tested is placed within a 300 ml beaker, and dissolved by an addition into the beaker of 150 ml of a 4:1 mixture of toluene/ethanol.

3. A KOH ethanol solvent at 0.1 mol/1 is titrated using a potentiometric titration device.

4. An equation (1), following, is used to compute the acid value of the binding resin, wherein a weight of the KOH solvent that is used in the present circumstance is treated as S (ml), the weight of the KOH solvent that is used in when another empty measurement is made simultaneously is treated as B (ml), and f is a KOH factor thereupon:

$$\text{Acid Value(mg KOH/g)} = [(S-B)*f*5.61]/W \quad (1)$$

It would be preferable, from a standpoint of the shelf life of the toner, for the binding resin of the toner and the composition material that includes the binding resin to comprise a glass transition temperature Tg that falls into a range of between 35 degrees C. and 80 degrees C., with a range of between 40 degrees C. and 75 degrees C. being more preferable still. The toner would be prone to degrading in a high temperature atmosphere with a Tg of less than 35 degrees C., and the toner would also be prone to offset occurring when being fixed. In addition, the ability of the toner to be fixed would deteriorate with a Tg in excess of 80 degrees C.

As an instance of the magnetic body that is used according to the present invention, it would be possible to cite such as the following:

1. A magnetic iron oxide, such as magnetite, maghemite, or ferrite, as well as an iron oxide that includes another metallic oxide substance;

2. A metal such as iron, cobalt, or nickel, as well as an alloy of these metals with a metal such as aluminum, cobalt, copper, lead, magnesium, tin, zinc, antimony, beryllium, bismuth, cadmium, calcium manganese, selenium, titanium, tungsten, or vanadium; or 3. An amalgam, etc., of the metals described herein.

Put another way, it would be possible to cite a specific substance such as $Fe_3O_4$, $\gamma$-$Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_2$, iron powder, cobalt powder, or nickel powder. It would be possible to use these substances as a single type, in isolation, as well as in a combination of two or more of these substances. Among these substances, a fine grain powder of $Fe_3O_4$ or $\gamma$-$Fe_2O_3$ would be particularly ideal.

In addition, it would also be possible to use a magnetic iron oxide that includes a different element, such as magnetite, maghemite, or ferrite, as well as an amalgam of these. As an instance of the different element that is used in the magnetic iron oxide, it would be possible to cite such as lithium, beryllium, boron, magnesium, aluminum, silicon, phosphorus, germanium, zirconium, tin, sulfur, calcium. scandium, titanium, vanadium, chromium, manganese, cobalt, nickel, copper, zinc, or gallium. As a preferable different element to be used in the magnetic iron oxide, a selection would be made from among magnesium, aluminum, silicon, phosphorus, or zirconium. Whereas it would also be permissible for the different element to be used in the magnetic iron oxide to be embedded within an iron oxide crystal lattice, to be embedded within the iron oxide as an oxide, or to be present upon a surface either as an oxide or a hydroxide, it would be preferable for the different element to be used in the magnetic iron oxide to be comprised as the oxide.

It would be possible to embed the different element to be used in the magnetic iron oxide within a particle by mixing a halogen of each respective different element to be used in the magnetic iron oxide when generating the magnetic body, and adjusting a pH thereupon. In addition, it would be possible to cause the different element to be used in the magnetic iron oxide to precipitate upon the surface of the particle, by either adjusting the pH after the generation of the magnetic particle, or by adding a halogen of each respective element, and adjusting the pH thereafter. It would be preferable for the weight of usage of the magnetic body to comprise a magnetic body within a range of between 10 parts and 200 parts with respect to 100 parts of the binding resin, with the magnetic body falling within a range of between 20 parts and 150 parts being more preferable still. It would be preferable for a number-average particle diameter of the magnetic bodies to fall into a range of between 0.1 μm and 2 μm, with a range of between 0.1 μm and 0.5 μm being more preferable still. It would be possible to derive the number-average particle diameter of the magnetic bodies by using such as a digitizer to measure an enlarged photograph that is captured with a transmission electron microscope (TEM).

In addition, as a magnetism characteristic of the magnetic body, it would be preferable for the magnetism characteristic to fall into a coercive force range of between 20 oersted and 150 oersted, a saturation magnetization range of between 50 emu/g and 200 emu/g, and a residual magnetization range of between 2 emu/g and 20 emu/g, for each of a respective impression of 10K oersted.

It is also possible to use the magnetic body as the coloring agent.

Coloring Agent

The coloring agent is not particularly restricted, and it would thus be possible to select a normally used resin as appropriate. As an instance of the coloring agent, it would be possible to cite such as carbon black, nigrosine dye, iron black, naphthol yellow S, Hansa yellow (10G, 5G, G), cadmium yellow yellow iron oxide, ocher, yellow lead, titanium yellow, Polyazo yellow, oil yellow, Hansa yellow (GR, A, RN, R), pigment yellow L, benzidine yellow (G, GR), permanent yellow (NCG), Vulcanfast yellow (5G, R), Tartrazine Lake quinoline yellow Lake, Anthrazane yellow BGL, isoindolinone yellow, burnt ocher, cinnabar, lead vermillion, cadmium red, cadmium mercury red, antimony vermillion, permanent red 4R, para red, parachlororthonitro aniline red, Lithol fast scarlet G, brilliant fast scarlet, brilliant carmine BS, permanent red (F2R, F4R, FRL, FRLL, F4RH), fast scarlet VD, Vulcan fast rubine B, brilliant scarlet G, Lithol rubin GX, permanent red F5R, brilliant carmine 6B, pigment scarlet 3B, Bordeaux 5B, toluidine maroon, permanent Bordeaux F2K, Helio Bordeaux BL, Bordeaux 10B, Bon maroon light, Bon maroon medium, eosin Lake, rhodamine Lake B, rhodamine Lake Y, alizarin Lake, thioindigo red B, thioindigo maroon, oil red, Quinacridone red, pyrazolone red, Polyazo red, chromium vermillion, benzidine orange, perinone orange, oil orange, cobalt blue, cerulean blue, alkali blue Lake, peacock blue Lake, Victoria blue Lake, non-metallic phthalocyanine blue, phthalocyanine blue, fast sky blue, indanthrene blue (RS, BC), indigo, lapis lazuli, ultramarine, anthraquinone blue, fast violet B, methyl violet Lake, cobalt purple, manganese purple, dioxane violet, anthraquinone violet, chromium green, zinc green, chromium oxide, viridian, emerald green, pigment green B, naphthol green B, green gold, acid green Lake, malachite green Lake, phthalocyanine green, anthraquinone green, titanium oxide, zinc pink, or Litho Bon, as well as amalgams of these substances. It would be preferable for the weight of the coloring agent so comprised to fall within a range of between 1% and 15% by mass with respect to the toner T, and a range of between 3% and 10% by mass with respect to the toner T would be more preferable still.

It would also be possible to employ the coloring agent that is employed according to the present invention as a master batch that is compounded with the resin. As an instance of the binder resin that is used in the manufacture of the master batch, or that is mixed with the master batch, in addition to both a denatured and an invariant polyester resin, it would be possible to cite such as a styrene, such as polystyrene, poly p-chlorostyrene, or polyvinyl toluene, as well as a polymer of a substitution product of these styrenes; a styrene copolymer such as styrene-p-chlorostyrene copolymer, styrene-propylene copolymer, styrene-vinyl toluene copolymer, styrene-vinyl napthalene copolymer, styrene methylacrylate copolymer, styrene-ethylacrylate copolymer, styrene-butylacrylate copolymer, styrene-octylacrylate copolymer, styrene-methylmethacrylamide copolymer, styrene-ethylmethacrylamide copolymer, styrene-butylmethacrylamide copolymer, styrene-α-methylchlormethacrylamide copolymer, styrene-acrylonitrile copolymer, styrene-vinyl methylketone copolymer, styrene-butadiene copolymer, styrene-isoprene copolymer, styrene-acrylonitrile-indene copolymer, styrene-maleic acid copolymer, or styrene-maleic acid ester copolymer; polymethyl methacrylate, polybutyl methacrylate, polyvinyl chloride, polyvinyl acetate (PVA), polyethylene, polypropylene, polyester, epoxy resin, epoxy polyol resin, polyurethane, polyamide, polyvinyl butyrol, polyacrylate resin, rosin, denatured rosin, terpene resin, an aliphatic or an alicyclic hydrocarbon resin, an aromatic petroleum resin, paraffin chloride, or paraffin wax. It would also be possible to use these substances as a single type, in isolation, as well as in a combination of two or more of these substances.

It would be possible to obtain the master batch by imparting a strong shearing force to the resin and the coloring agent for the master batch, thereby compounding and mixing the resin and the coloring agent. In such a circumstance, it would be possible to employ an organic solvent in order to increase a reciprocal effect of the coloring agent and the resin. In addition, a so-called flashing method, wherein a water-based paste, which includes the coloring agent in water, is compounded and mixed with the resin and the organic solvent, the coloring agent is caused to transition to the resin side of the mixture, and the water component and the organic solvent component are removed, is ideal, owing to the fact that a wet cake of the coloring agent may be employed as is, without needing to be desiccated. A strong shearing dispersal apparatus, such as a three blade roll mill, would be ideal for the compounding and mixing of the coloring agent, the resin, and the organic solvent.

It would be preferable for a weight of usage of the master batch to fall into a range of between 0.1 parts and 20 parts, with respect to 100 parts of the binding resin.

In addition, it would be preferable for the resin of the master batch to comprise an acid value of less than or equal to 30 mg KOH/g, an amine value that falls into a range of between 1 and 100, and to be used with the coloring agent dispersed thereupon, with an acid value of less than or equal to 20 mg KOH/g, an amine value that falls into a range of between 1 and 50, and to be used with the coloring agent dispersed thereupon being more preferable still. If the acid value is greater than 30 mg KOH/g, a charging characteristic of the master batch deteriorates under a condition of a high moisture, and thus, a pigment dispersal upon the master batch may be insufficient as a result. In addition, the pigment dispersal upon the master batch may also be insufficient if the amine value is less than 1 or the amine value is greater than 100. It is to be understood that it would be possible to measure the acid value by way of a method that is disclosed according to JIS K-0070, and that it would be possible to measure the amine value by way of a method that is disclosed according to JIS K-7237.

In addition, from a standpoint of the ability to disperse the pigment, it would be preferable for the dispersal agent to comprise a strong compatibility with the binding resin, and as a concrete commercially available dispersal agent that comprises the strong compatibility with the binding resin, it would be possible to cite such as AJISPER PB821 and AJISPER PB822, manufactured by Ajinomoto Fine-Techno Co., Inc., Disperbyk-2001, manufactured by Byk Additives & Instruments (a member of Altana), and EFKA-4010, manufactured by EFKA Additives (a member of Ciba Specialty Chemicals).

It would be preferable for the dispersal agent to combine within the toner at a proportion that falls into a range of between 0.1% and 10% by mass with respect to the coloring agent. If the proportion of the combination of the dispersal agent with respect to the coloring agent is less than 0.1% by mass, the pigment dispersal may be insufficient as a result, whereas, if the proportion of the combination of the dispersal agent with respect to the coloring agent is greater than 10% by mass, the charging characteristic may deteriorate under the condition of the high moisture.

It would be preferable for a weight-average molecular weight of the dispersal agent to fall into a range of between 500 and 100,000, a main peak, i.e., an extremely large value, of the molecular weight, with respect to a styrene conversion mass as determined by the gel permeation chromatography, and it would be more preferable still, from a standpoint of the ability to disperse the pigment, for the weight-average molecular weight of the dispersal agent to fall into a range of between 3000 and 100,000. It would be especially preferable for the weight-average molecular weight of the dispersal agent to fall into a range of between 5000 and 50,000, and a range of between 5000 and 30,000 to be most preferable of all. If the molecular weight is less than 500, the extremity may increase, and the ability of the dispersal of the coloring agent may deteriorate as a result, whereas, if the molecular weight is greater than 100,000, the affinity of the dispersal agent for the solvent may increase, and the ability of the dispersal of the coloring agent may deteriorate as a result.

It is preferable that an additive quantity of the dispersal agent fall within a range of between 1 part and 50 parts with respect to 100 parts of the coloring agent, and a range of between 5 parts and 30 parts would be more preferable still. If the additive quantity of the dispersal agent is less than 1 part, a dispersal function of the dispersal agent may deteriorate as a result, whereas, if the additive quantity of the dispersal agent is greater than 50 parts, the charging characteristic may instead deteriorate as a result.

Other Components
Carrier

It would be permissible to use the toner T according to the present invention as a two component developing solution in a mixture with a carrier. It would be possible to use a typical carrier, such as ferrite or magnetite, as well as a resin coating carrier, as the carrier that is mixed with the toner T.

The resin coating carrier is formed from a carrier core particle and a coating material, which is a resin that coats a surface of the carrier core particle. As the resin that is used as the coating material that coats the surface of the carrier core particle, a styrene-acrylic resin, such as styrene-acrylate ester copolymer or styrene-methacrylamide ester copolymer, an acrylic resin, such as acrylate ester copolymer or methacrylamide ester copolymer, a resin comprising a fluorine group, such as polytetrafluoroethylene, monochlorotrifluoroethylene polymer, or polyfluoride vinylidene, silicon resin, polyester resin, polyamide resin, polyvinyl butyrol, or aminoacrylate resin, would be ideal. Another resin that would be usable as the coating material of the carrier would include such as ionomer resin or polyphenylene sulfide resin. It would also be possible to use the resins described herein as a single type, in isolation, as well as in a combination of two or more of these resins. In addition, it would also be possible to employ a carrier core of a binder type wherein a magnetic grain is dispersed within the resin.

With respect to the resin coating carrier, it would be possible to apply, as a method of coating the surface of the carrier core with a resin coating agent, at a minimum, either a method that either dissolves or suspends the resin and causes the resin thus treated to adhere to the carrier core whereupon it is applied, or else a method that simply compounds the resin in a powdered state.

Whereas it would be permissible to determine a proportion of the resin coating material with respect to the resin coating carrier, it would be preferable for the proportion of the resin coating material with respect to the resin coating carrier to fall within a range of between 0.01% and 5% by mass, and it would be more preferable still for the proportion of the resin coating material with respect to the resin coating carrier to fall within a range of between 0.1% and 1% by mass.

As an instance wherein a coating agent comprising a compound of two or more substances is used to coat the magnetic body, the following may be cited:

1. Processing a titanium oxide granular body of 100 weight portion with a compound of 12 weight portion dimethyl dichlorosilane and dimethyl silicon oil in a 1:5 weight proportion; and 2. Processing a silica granular body of 100 weight portion with a compound of 20 weight portion dimethyl dichlorosilane and dimethyl silicon oil in a 1:5 weight proportion.

Ideally, a styrene-methacrylamide methylate copolymer, a compound comprising a fluorinated resin and a styrene copolymer, or a silicon resin would be used within the resin, with the silicon resin being especially preferable.

As an instance of the compound of the fluorinated resin and the styrene copolymer, it would be possible to cite a compound of polyfluoride vinylidene and styrene-methylmethacrylate copolymer, a compound of polytetrafluoroethylene and styrene-methylmethacrylamide copolymer, and a compound of fluoride vinylidene-tetrafluoroethylene copolymer (copolymer weight proportion from 10:90 to 90:10), styrene-acrylate 2-ethylhexyl copolymer (copolymer weight proportion from 10:90 to 90:10), and styrene-acrylate 2-ethylhexyl methylmethacrylamide copolymer (copolymer weight proportion from 20:60:5 to 30:10:50).

As the silicon resin, it would be possible to cite a denatured silicon resin which is generated by a reaction between a silicon nitrogen compound resin, a nitrogen silane coupling agent, and a silicon resin. As an instance of the magnetic material of the carrier core, it would be possible to employ an oxide, such as ferrite, hyperferrous ferrite, magnetite, or γ-iron oxide, a metal such as iron, cobalt, or nickel, as well as an alloy of the materials described herein.

In addition, it would be possible to cite, as an element that is included within the magnetic materials described herein, iron, cobalt, nickel, aluminum, copper, lead, magnesium, tin, zinc, antimony, beryllium, bismuth, calcium, manganese, selenium, titanium, tungsten, or vanadium. Among the elements described herein, the following would be especially ideal: copper zinc, as well as copper-zinc-iron ferrite, wherein the iron component is presumed to comprise the primary component, manganese, magnesium, as well as manganese-magnesium-iron ferrite, wherein the iron component is presumed to comprise the primary component.

A resistance value of the carrier should fall within a range of between 106 Ω·cm and 1010 Ω·cm, by adjusting a degree of a roughness of the surface of the carrier, as well as the mass of the resin that coats the carrier. Whereas it would be possible to use a particle diameter of between 4 μm and 200 μm as the particle diameter of the carrier, a range of between 10 μm and 150 μm as the particle diameter would be preferable, with a range of between 20 μm and 100 μm being more preferable still. A range of between 20 μm and 70 μm would be especially preferable, wherein the resin coating carrier comprises 50% of the particle diameter. With the two component developing solution, it would be preferable to use a weight portion of the toner according to the present invention that falls into a range of between 1 and 200 with respect to a weight portion of the carrier of 100, and it would be more preferable still to use a weight portion of the toner that falls into a range of between 2 and 50 with respect to a weight portion of the carrier of 100.

Wax

In addition, it would also be possible to include a wax within both the binding resin and the coloring agent. The wax that is used is not particularly limited, and it would thus be possible to select and use a typically used wax thereupon as appropriate. As an instance of the wax that is used within the binding resin and the coloring agent, it would be possible to cite such as an aliphatic hydrocarbon wax, such as low molecular weight polyethylene, low molecular weight polypropylene, a polyolefin wax, microcrystalline wax, paraffin wax, or Sasol wax, an oxide of an aliphatic hydrocarbon wax, such as polyethyloxide wax, or a block copolymer of these waxes, a plant derived wax such as candelilla wax, carnauba wax, vegetable wax, or jojoba wax, an animal product wax such as beeswax, lanolin, or spermaceti, a mineral based wax such as Ozokerite, ceresin, or petrolatum, or a type of wax that treats a fatty acid ester as a primary component, such as montanic acid ester wax or castor wax. It would also be possible to cite such as a partially or totally deoxidized fatty acid ester wax, such as deoxidized carnauba wax.

Furthermore, as the wax that is used within both the binding resin and the coloring agent, it would be possible to cite a saturated linear chain fatty acid, such as palmitic acid, stearic acid, montanic acid, or a linear chain alkyl carbonate further comprising a linear chain alkyl, an unsaturated fatty acid such as eleostearic acid or parinaric acid, a saturated alcohol such as stearyl alcohol, eicosyl alcohol, behenyl alcohol, carnaubyl alcohol, seryl alcohol, melissyl alcohol, or a long chain alkyl alcohol, a polyvalent alcohol such as sorbitol, a fatty acid amide such as linoleate amide, olefiate acid amide, or laurate amide, a saturated fatty acid bisamide such as methylene biscapriate amide, ethylene bislaurate amide, hexamethylene bistearate, an unsaturated fatty acid amide such as ethylene bisoleate amide, hexamethylene bisoleate amide, N,N'-dioleal adipate amide, or N,N'-dioleal sebacate amide, an aromatic bisamide such as m-xylene bistearate amide, N,N-distearyl isophthalate amide, a fatty acid metallic salt such as calcium stearate, calcium laurate, zinc stearate, or magnesium stearate, a wax that is grafted by employing a vinyl monomer, such as styrene or acrylate upon a aliphatic hydrocarbon wax, a compound of a fatty acid and a partial ester polyvalent alcohol, such as behenic acid monoglyceride, or a methyl ester compound, comprising a hydroxyl group, that is obtained by adding a hydrogen to a vegetable derived oil or fat.

In addition, as a more preferred instance, it would be possible to cite a wax such as a polyolefin that is formed by radical polymerizing of an olefin under a high pressure, a polyolefin that is obtained when polymerizing a high molecular weight polyolefin by refining a low molecular weight by-product of the polymerizing of the high molecular weight polyolefin, a polyolefin that is polymerized by employing a medium at low pressure, such as a Ziegler medium or a metallocene medium, a polyolefin that is polymerized by employing a radiation, an electromagnetic wave, or a light, a low molecular weight polyolefin that is obtained by thermally cracking a high molecular weight polyolefin, paraffin wax, microcrystalline wax, Fischer-Tropsch wax, a synthetic hydrocarbon wax that is synthesized by such as Zintol method, Hydrocol method, or AG method, a synthetic wax that treats a single carbon compound as a monomer, a hydrocarbon wax comprising a functional group such as a hydroxide group or a carboxyl group, a compound of a hydrocarbon wax with a hydrocarbon wax comprising a functional group, or a denatured wax, treating the waxes described herein as a matrix, whereupon a vinyl monomer, such as styrene, maleic acid ester, acrylate, methacrylate, or maleic acid anhydride is grafted.

In addition, it would be preferable for the waxes described herein to be employed subsequent to employing a press sweat technique, a solvent technique, a recrystallization technique, a vacuum distillation technique, a supercritical gas extraction technique, or a solution crystallization technique to sharpen the molecular weight distribution, as well as to remove a low molecular weight solid fatty acid, a low molecular weight solid alcohol, a low molecular weight solid compound, or another such impurity thereupon.

It would be preferable, as a melting point of the wax, in order to achieve a balance between an ability to be fixed and a resilience to offset, to fall in a range of between 70 degrees C. and 140 degrees C., with a range of between 70 degrees C. and 120 degrees C. being more preferable still. If the melting point of the wax is less than 70 degrees C., a resilience to blocking may deteriorate as a result, whereas, if the melting point of the wax is greater than 140 degrees C., a manifestation of the resilience to offset effect may be impeded as a result.

In addition, combining two or more different types of wax will allow simultaneously manifesting a plasticizing effect and a release effect, which are effects of the wax.

As an instance of a type of wax comprising the plasticizing effect, it would be possible to cite such as a wax comprising a low melting point, or a structure further comprising a branching or a polar group with respect to a molecular structure of the wax.

As an instance of a type of wax comprising the release effect, it would be possible to cite such as a wax comprising a high melting point, or, as a molecular structure of the wax, comprises a linear chain structure or does not comprise a functional group. As an instance of a usage of a combination wax, it would be possible to cite such as a combination wherein a difference between the melting points of two or more different kinds of wax would fall into a range of between 10 degrees C. and 100 degrees C., or a combination of polyolefin and a denatured polyolefin that is grafted upon the polyolefin.

When selecting the two types of wax, in a circumstance wherein the two types of wax comprise a similar structure, the wax comprising the relatively lower melting point manifests the plasticizing effect, whereas the wax comprising the relatively higher melting point manifests the release effect. In such a circumstance, a division of the functions between the two types of wax is manifested in an effectual manner when the difference between the melting points falls within a range of between 10 degrees C. and 100 degrees C. If the difference between the melting points is less than 10 degrees C., the manifestation of the effect of the division of the functions may be impeded as a result, whereas if the difference between the melting points is greater than 100 degrees C., a performance of an emphasis of the functions of the two types of wax by way of a reciprocal effect may be impeded as a result. In such a circumstance, given that a trend toward an case in the manifestation of the effect of the division of the functions is present, it would be preferable for the melting point of one of the waxes, at a minimum, to fall within a range of between 70 degrees C. and 120 degrees C., and a range of between 70 degrees C. and 100 degrees C. would be more preferable still.

Within the wax thus formed, a denatured wax component that comprises the branching structure or the functional group such as the polar group, thereby differing relatively from the primary component of the compound wax manifests the plasticizing effect, whereas the invariant, i.e., linear, wax component that comprises the linear chain structure or that is non-polar, not comprising the functional group, manifests the release effect. As a preferable wax combination, it would be possible to cite a combination of a polyethylene homopolymer or copolymer that treats ethylene as the primary component of the homopolymer or copolymer with a polyolefin homopolymer or copolymer that treats an olefin other than ethylene as the primary component of the homopolymer or copolymer, a combination of a polyolefin and a grafted metamorphic polyolefin, a combination of an alcohol wax, a fatty acid wax, or an ester wax with a hydrocarbon wax, a combination of a Fischer-Tropsch wax or a polyolefin wax with a paraffin wax or a microcrystalline wax, a combination of a Fischer-Tropsch wax with a polyolefin wax, a combination of a paraffin wax with a microcrystalline wax, or a combination of carnauba wax, candelilla wax, rice wax, or montanic wax with a hydrocarbon wax.

Regardless of the combination that is chosen, it is easy to achieve a balance between the shelf life of the toner and the ability of the toner to be fixed, and thus, with respect to an endothermic peak that is observed with a DSC measurement of the toner, it would be preferable for a maximum peak temperature to be present within a region of between 70 degrees C. and 110 degrees C., with a region of between 70 degrees C. and 110 degrees C. comprising the maximum peak temperature being more preferable still.

As a total mass of the wax that is described herein, it would be preferable for the total mass of the wax to fall into a range of between 0.2 parts to 20 parts with respect to 100 parts of the obligatory resin 100, with a range of between 0.5 part to 10 parts with respect to 100 parts of the binding resin 100 being more preferable still.

According to the present invention, the maximum peak temperature of the endothermic peak of the wax, which is measured with the DSC, is presumed to comprise the melting point of the wax.

As a DSC measurement instrument of the wax or the toner, it would be preferable to perform the measurement with a differential calorimetry in an intra-cooler power compensation type with high precision. A method of the measurement is performed in accordance with ASTM D3418-82. A DSC curve that is employed according to the present invention is employed, after the temperature of the substance to be measured is caused to increase and decrease through a single cycle, and a history taken thereupon, when the temperature of the substance is measured upon being caused to increase at a speed of 10 degrees C. per minute.

Liquidity Improver

It would also be permissible to add a liquidity improver to the toner T according to the present invention. The liquidity improver improves a liquidity of the toner, i.e., makes the toner more liquid, upon an application of the liquidity improver to the surface of the toner.

As an instance of the liquidity improver, it would be possible to cite such as carbon black, a fluorine resin powder such as fluoride vinylidene fine grain powder or polytetrafluoroethylene fine grain powder, a fine grain powder silica such as a wet process silica or a dry process silica, a fine grain powder titanium oxide, a fine grain powder aluminum oxide, a processed silica, a processed titanium oxide, or a processed aluminum oxide, whereupon a surface processing of the silica, the titanium oxide, or the aluminum oxide, is carried out by way of a silane coupling agent, a titanium coupling agent, or a silicon oil. From among the substances described herein, the fine grain powder silica, the fine grain powder titanium oxide, or the fine grain powder aluminum oxide would be preferable, and moreover, the processed silica whereupon the surface processing of the silica by way of the silane coupling agent or the silicon oil would be further preferable still.

As the grain diameter of the liquidity improver, it would be preferable as an average first order grain diameter to fall into a range of between 0.001 μm and 2 μm, and a range of between 0.002 μm and 0.2 μm being more preferable still.

The fine grain powder silica is a fine grain body that is generated by way of a gaseous phase oxidation of a substance comprising a silicon halide, a substance that is referred to the dry process silica or a fumed silica.

As an instance of a commercially available silica fine grain body that is generated by the gaseous phase oxidation of the substance comprising silicon halide, it would be possible to cite such as AEROSIL, AEROSIL-130, AEROSIL-300, AEROSIL-380, AEROSIL-TT600, AEROSIL-MOX170, AEROSIL-MOX80, or AEROSIL-COK84, which are trademarks of Nippon Aerosil, now Evonik Degussa, a subsidiary of Evonik Industries AG; Ca—O—SiL-M-5, Ca—O—SiL-MS-7, Ca—O—SiL-MS-75, Ca—O—SiL-HS-5, or Ca—O—SiL-EH-5, which are trademarks of Cabot Corporation; Wacker HDK-N20 V15, Wacker HDK-N20E, Wacker HDK-T30, or Wacker HDK-T40, which are trademarks of Waeker-Chiemie GmbH; D-C Fine Silica, a trademark of Dow Corning Toray Co., Ltd.; or Fransol, a trademark of Fransil Co., Ltd.

Furthermore, it would be more preferable still for the silica fine grain body that is generated by the gaseous phase oxidation of the substance comprising silicon halide to comprise a processed silica fine grain body whereupon a hydrophobicity process has been performed. With respect to the processed silica fine grain body, it would be especially preferable the silica fine grain body to be processed such that a degree of the hydrophobicity that is measured by a methanol titration test preferably denotes a value that falls into a range of between 30% and 80%. The hydrophobicity is applied by way of either a reaction with the silica fine grain body, or either a chemical or a physical process, with such as an organic silicon compound that physically adsorbs the silica fine grain body. As a preferable method of the hydrophobicity, a method that processes the silica fine grain body that is generated by the gaseous phase oxidation of the substance comprising silicon halide with the organic silicon compound would be desirable.

As the organic silicon compound, it would be possible to cite such as hydroxypropyl trimethoxysilane, phenyl trimethoxysilane, n-hexadecyl trimethoxysilane, n-octadecyl trimethoxysilane, vinyl methoxysilane, vinyl triethoxysilane, vinyl triacetoxysilane, dimethyl vinyl chlorosilane, divinyl chlorosilane, γ-methacrylamide oxypropyl trimethoxysilane, hexamethyl disilane, trimethylsilane, trimethyl chlorosilane, dimethyl dichlorosilane, methyl trichlorosilane, allyl dimethyl chlorosilane, allyl phenyl dichlorosilane, benzyl dimethyl chlorosilane, bromomethyl dimethyl chlorosilane, α-chlorethyl trichlorosilane, β-chloroethyl trichlorosilane, chloromethyl dimethylchlorosilane, triorganosilyl mercaptan, trimethylsilyl mercaptan, triorganosilyl acrylate, vinyl dimethyl acetoxysilane, dimethylethoxysilane, trimethyl othoxysilane, trimethyl methoxysilane, methyl triethoxysilane, isobutyl trimethoxysilane, dimethyl dimethoxysilane, diphenyl diethoxysilane, hexamethyl disiloxane, 1,3-divinyl tetramethyl disiloxane, or 1,3-diphenyl tetramethyl disiloxane, as well as a dimethyl polysiloxane, comprising between 2 and 12 siloxane units per molecule, and either zero or one hydroxyl group bonded to a silicon atom on a basis of a unit that is located at an end of the molecule, respectively. Furthermore, it would be possible to cite a silicon oil, such as dimethyl silicon oil. It would be possible to use these substances as a single type, in isolation, as well as in a combination of two or more of these substances.

As a number-average diameter of the liquidity improver, it would be preferable to fall into a range of between 5 nm and 100 nm, with a range of between 5 nm and 50 nm being more preferable still.

It would be preferable for a specific surface area by way of a nitrogen adsorption that is measured with a BET technique to comprise a specific surface area that is greater than or equal to 30 m$^2$/g, with a specific surface area that falls into a range of between 60 m$^2$/g and 400 m$^2$/g being more preferable still. It would be preferable for the fine grain body that is surface processed to be greater than or equal to 20 m$^2$/g, with a range of between 40 m$^2$/g and 300 m$^2$/g being more preferable still.

It would be preferable for a dosage of the fine grain bodies described herein to fall into a range of between 0.03 part and 8 parts with respect to 100 parts of the toner particle.

As another additive, it would be possible to add such as the following to the toner according to the present invention, as necessary for an objective such as protecting the electrostatic latent image support body or the carrier, improving a cleaning characteristic of the toner, adjusting a thermal characteristic, an electrical characteristic, or a physical characteristic of the toner, adjusting a resistance of the toner, adjusting a softening point of the toner, or improving a degree of the fixing of the toner: any type of metallic soap, a fluorine surfactant, dioctyl phthalate, such as tin oxide, zinc oxide, carbon black, or antimony oxide as an agent conferring a conductivity upon the toner, or an inorganic fine grain body such as titanium oxide, aluminum oxide, or alumina. It would also be permissible to make hydrophobic the inorganic fine grain bodies described herein as necessary. In addition, it would also be possible to employ, in small quantities, as an improver of the quality of the development of the toner, a lubricant such as polytetrafluoroethylene, zinc stearate, or polyfluoride vinylidene, an abrasive such as cesium oxide, silicon carbide, or strontium titanate, or a caking prevention agent, and furthermore, white fine grain particles and black fine grain particles that comprise a polarity that is opposite to the polarity of the toner particles.

It would also be preferable for the additives described herein to be processed by any or all of a processing agent, such as is described hereinafter, in order to achieve an objective such as controlling the quantity of the charge of the toner; a silicon varnish, each type of denatured silicon varnish, a silicon oil, each type of denatured silicon oil, a silane coupling agent, silane coupling agent comprising a functional group, or another organic silicon compound.

When preparing the developing solution, it would be permissible to add and mix into the developing solution, the inorganic fine grain particle such as the hydrophobic silica fine grain powder that is described herein, in order to increase the liquidity, the shelf life, the quality of the developing, and the transferability of the developing solution. Whereas it would be possible to select and use a typical granular compounding device for compounding an external application agent as appropriate, it would be preferable to be able to apply a coat such as a jacket, and to be able to adjust an internal temperature. When changing a history of a load that is applied upon the external application agent, it would be permissible to apply the external application agent either during the process or gradually, it would also be permissible to change such as a number of rotations, i.e., per minute, a speed of transition, a time, or a temperature of the compounding device, and it would further be possible to commence by imparting a high load, and thereafter imparting a comparatively lower load, as well as a converse thereof.

As an instance of the compounding device that would be usable in the present circumstance, it would be possible to cite such as a V-shaped compounding device, a rocking mixer, a lading mixer, a Nautor mixer, or a Henschel mixer.

As a method of further adjusting a shape of the toner that is obtained, no particular limitation is imposed, and it would be possible to select an adjustment method as appropriate to an intended objective, and it would be possible to cite, as an instance thereof, such as, after fusing, mixing, and pulverizing the toner material that is formed from the binding resin and the coloring agent, a method that employs such as a hybridizer or mechano-fusion upon the powdered toner material to mechanically adjust the shape of the toner, as well as, after dissolving and dispersing the toner material within a solvent that is capable of dissolving the toner binder with the so-called spray desiccation method, a method that obtains a spherical toner by employing a spray desiccation device to remove the solvent from the toner, or a method that forms the spherical toner by heating the toner within the water based medium.

As the external application agent, it would be possible to preferentially employ the inorganic fine grain particle.

As an instance of the inorganic fine grain particle, it would be possible to cite such as silica, aluminum oxide, titanium oxide, barium titanate, magnesium titanate, calcium titanate, strontium titanate, zinc oxide, tin oxide, silica sand, clay, mica, wollastonite, diatomite, chromium oxide, cerium oxide, red haematite, antimony trioxide, magnesium oxide, zirconium oxide, barium sulfate, barium carbonate, calcium carbonate, or silicon nitride.

It would be preferable for a first order particle diameter of the inorganic fine grain particle to fall within a range of between 5 μm and 2 μm, with a range of between 5 μm and 500 nm being more preferable still. It would be preferable for the specific surface area by way of the BET technique to fall between a range of between 20 m$^2$/g and 500 m$^2$/g. It would be preferable for a usage proportion of the inorganic fine grain particle to fall within a range of between 0.01% and 5% by mass of the toner, with a range of between 0.01% and 2.0% by mass of the toner being more preferable still.

It would additionally be possible to cite, as an instance of a high polymer fine grain particle, a polymer particle by way of a polycondensation thermosetting resin, such as a polystyrene, a methacrylamide ester, an acrylate ester copolymer, or a silicon, a benzoguanamine, or as nylon, which is obtained by a soap free emulsion polymerization, a suspension polymerization, or a dispersal polymerization. It would be possible to avoid a hydrophobicity with respect to the external application agent by way of a surface processing agent thereupon, allowing preventing a degradation of the external application agent per se even under a condition of a high degree of humidity.

As an instance of the surface processing agent, such as the silane coupling agent, a silylate agent, a silane coupling agent comprising a fluoride alkyl group, an organic titanate coupling agent, an aluminum coupling agent, a silicon oil, or a denatured silicon oil would be ideal.

It would be permissible for the first order particle diameter of the inorganic fine grain particle to fall into a range of between 5 μm and 2 μm, with a range of between 5 μm and 500 nm being more preferable still. In addition, it would be permissible for the specific surface area by way of the BET technique to fall into a range of between 20 m$^2$/g and 500 m$^2$/g. It would be permissible for a usage proportion of the inorganic fine grain particle to fall within a range of between 0.01% and 5% by weight of the toner, with a range of between 0.01% and 2.0% by weight of the toner being more preferable still.

As an instance of an improver of the cleaning characteristic, in order to remove the developing solution that remains upon the electrostatic latent image support body or a first order transfer medium after the transfer of the image, it would be possible to cite such as a fatty acid metallic salt such as zinc stearate, calcium stearate, or stearic acid, as well as a polymer fine grain particle that is manufactured by way of the soap free emulsion polymerization, such as a polymethyl methacrylate fine grain particle or a polystyrene fine grain particle. A narrow comparative particle density distribution of the polymer fine grain particle, wherein a volume-average particle diameter falls into a range of between 0.01 μm and 1 μm, would be preferable.

Whereas it would be possible for the development method according to the present invention to use all of the electrostatic latent image support bodies that are used in the conventional electrophotography technique, it would be ideal, as an instance thereof, to use such as an organic electrostatic latent image support body, an amorphous silica electrostatic latent image support body, a selenium electrostatic latent image support body, or a zinc oxide electrostatic latent image support body.

EXAMPLES

Following is a description of concrete examples according to the embodiment. It is to be understood that the present invention is not limited to the following examples in any way.

First Example

Preparation of Coloring Agent Dispersal Solution

First, a carbon black dispersal solution is prepared as the coloring agent. A carbon black (Regal 1400, manufactured by Cabot Corp.) of 17 parts, a pigment dispersal agent of 3 parts, and an ethyl acetate of 80 parts, is subjected to a first order dispersal by using a mixer comprising a mixing blade. AJISPER PB821, manufactured by Ajinomoto Fine-Techno Co., Inc., is used as the pigment dispersal agent. A dyno mill is employed to finely disperse, by way of a powerful shearing force, the first order dispersal solution that is thereby obtained, and a second order dispersal solution is prepared, that completely removes an agglomeration of greater than or equal to 5 μm in size.

Preparation of Wax Dispersal Solution

Next, the wax dispersal solution is prepared. A carnauba wax of 18 parts, a wax dispersal agent of 2 parts, and an ethyl acetate of 80 parts, is subjected to a first order dispersal by using a mixer comprising a mixing blade. The first order dispersal solution is heated to 80 degrees C. while being mixed, thereby melting the carnauba wax, whereupon the temperature of the solution is lowered to room temperature, and a wax particle is precipitated therefrom such that a maximum diameter of the wax particle within the solution is less than or equal to 3 μm. As the wax dispersal agent, a substance is used wherein a styrene-butyl acrylate copolymer is grafted upon a polyethylene wax. A dyno mill is employed to further finely disperse, by way of a powerful shearing force, the dispersal solution that is thus obtained, thereby adjusting such that a maximum diameter of the wax particle within the solution is less than or equal to 2 μm.

Preparation of Toner Composition Dispersal Solution

Next, the toner composition dispersal solution is prepared, which is formed from a composition to be described hereinafter, wherein is added the binding resin as a resin, the coloring agent dispersal solution, and the wax dispersal solution. The mixer comprising the mixing blade is used to perform a mixing for 10 minutes of a polyester resin of 100 parts as the binding resin, the coloring agent dispersal solution of 30 parts, the wax dispersal solution of 30 parts, and the ethyl acetate of 840 parts, forming a uniform dispersal of the mixture. Neither the pigment nor the wax particles are agglomerated by way of a dilution of the solvent.

Creation of the Toner

The dispersal solution that is obtained by the procedure described herein is stored within the storage portion 14 of the droplet discharge unit that is described in FIG. 2. The thin film 12 that is used according to the invention comprises alumina of 99.9% purity and a thickness of 0.15 mm, and the nozzle 11 is formed upon the thin film 12 by employing the excimer laser in an ablation process. A shape of the nozzle 11 comprises a circular shape with a diameter of 10 μm, and the nozzle 11 thereof is positioned upon a parallelogram shaped surface region of the thin film 12 in a staggered arrangement at a pitch of 100 μm, in opposition to the oscillation surface 13A. Put another way, the oscillation surface whereupon the nozzle 11 is positioned is presumed to comprise approximately an entire surface that is in opposition to the oscillation surface 13A of the oscillation device 13.

It is to be understood that the oscillation device 13 comprises the oscillation generating device 21, which in turn comprises a piezoelectric body in two layers with a thickness of 7.0 mm and a diameter of 20 mm, the oscillation surface 13A comprises a rectangular shape, and bonded to the oscillation amplification device 22, which in turn comprises a long side of 50 mm and a short side of 10 mm.

After the dispersal solution is prepared, the droplet is discharged, the droplet thus discharged is desiccated and solidified, and a toner matrix is produced thereby, according to a toner manufacture condition such as is described hereinafter.

Toner Manufacture Condition

Dispersal Solution Solid Portion: 8.0%

Dispersal Solution Specific Gravity: ρ=1.154 g/cm$^3$

Desiccation Gaseous Body Flow Volume: 30.0 liters per minute of dry nitrogen internal to apparatus Desiccation Intake Temperature: 60 degrees C.

Desiccation Outflow Temperature: 45 degrees C.

Dew Point: −20 degrees C.

Oscillation Excitation Frequency: 73 kHz

The toner particle that has been solidified by desiccation is collected by a vortex. When the particle density distribution of the collected particles is measured under a measuring condition that is denoted hereinafter by a flow particle imaging analyzer, i.e., an FPIA-2000, the weight-average particle diameter, i.e., D4, was 5.6 μm, and the number-average particle diameter, i.e., Dn, was 5.1 μm. In addition, the quantity of the toner that was manufactured per hour was 350 g.

Assessment of the Toner

An assessment of the toner that is obtained by the procedure described herein is performed as follows. It is to be understood that a result of the assessment is depicted in Table 1.

Particle Density Distribution

Following is a description relating to a measurement method that uses the flow particle image analyzer.

As an instance of a measurement of the toner, the toner particle, and the external application agent, by way of the flow particle image analyzer, it would be possible to employ the FPIA-2000 flow particle image analyzer, manufactured by TOA MEDICAL ELECTRONICS, INC. to perform the measurement. The measurement applies a filter to remove particulate debris, and as a result, a quantity of droplets of a nonionic surfactant, preferably Contaminon N, manufactured by Wako Pure Chemical Industries Co., Ltd., is added to 10 ml of water wherein the quantity of particles is less than or equal to 20 particles, within a measurement range within $10^{-3}$ cm$^3$ of water, greater than or equal to 0.60 µm and less than 159.21 µm, as an instance thereof. Furthermore, a measurement material of 5 mg is added to the solution, a dispersal process is performed for one minute, using a UH-50 ultrasound dispersal device, manufactured by STM, under a condition of 50 watts per cubic centimeter, and moreover, the dispersal process is performed for a total of five minutes, whereafter a testing material dispersal solution is employed, comprising a particle density of the measurement testing material of between 4000 and 8000 particles/$10^{-3}$ cm$^3$, wherein a particle corresponding to a range of an approximate circular measuring diameter of the assessment is targeted, and the particle density distribution of the particle that comprises the approximate circular diameter that is greater than or equal to 0.60 µm and less than 159.21 µm is measured.

The measuring material dispersal solution traverses a flow path, which expands in a direction of a flow of the toner, and which comprises a flat, compressed, transparent flow cell, further comprising an approximate thickness of 200 µm. In order to form a light path that intersects and passes through the thickness of the flow cell, a strobe and a CCD camera is installed so as to be located on respectively opposite sides with respect to the flow cell. While the testing material dispersal solution is flowing, the strobe light is projected at 1/30 second intervals, in order to obtain an image of the particle that flows through the flow cell, and as a result, each respective particle thereupon is photographed as a two-dimensional image comprising a parallel fixed range within the flow cell. The diameter of the circle that comprises a common surface area is computed as the approximate circular diameter, from a surface area of the two dimensional image of each respective particle thereupon.

It would be possible to measure the approximate circular diameter of 1200 or more particles within approximately one minute, and it would be possible to measure a proportion, i.e., a quantity as a percentage, of the particles that comprise the approximate circular diameter that is quantified and regulated by a distribution of the approximate circular diameter. It is possible to obtain a result, i.e., a frequency percentage and a cumulative percentage, as depicted in Table 1, wherein the range between 0.06 µm and 400 µm is divided into 226 channels, such that one octave is divided into 30 channels. With regard to an actual measurement, the measurement of the particles is performed with the range of the approximate circular diameter being greater than or equal to 0.60 µm and less than 159.21 µm.

Reproducibility of Fine Lines

The developing solution was loaded into a modified version of a commercially available copier, i.e., an Imagio Neo 271, manufactured by Ricoh, a development device portion whereof having been modified, and a run performed thereupon employing Ricoh 6000 Paper with an image possession rate of 7%. A fine line portion of a tenth image at an initial stage of the run, and of a 30,000th image thereof, is compared with a source document, which are examined at 100× magnification under an optical microscope, and assessed at four stages by for a state of a line not being properly copied, in comparison with a sample in stages. The image quality is denoted from best to worst as follows: "◉>○>Δ>×," wherein the "×" assessment denotes a level of image reproduction that is unusable as a viable product. When the toner comprises a negative polarity, the organic electrostatic latent image support body is used, whereas, when the toner comprises a positive polarity, the amorphous silicon electrostatic latent image support body is used instead.

The resin coating carrier, which is used in the conventional electrophotography, is used as the conveyor device. A substance described as follows is employed as the carrier.

Carrier

Core: Spherical ferrite particles, comprising an average diameter of 50 µm;

Material comprising coating material: Silicon resin

The silicon resin is dispersed within the toluene, and the resulting dispersal solution is adjusted, spray coated upon the core in a heated state, baked and cooled upon the core, and thereafter, manufactured into a carrier particle comprising an average coating resin film thickness of 2.0 µm.

Second Example

The target toner was obtained under conditions identical to the first example, except that the thickness of the thin film 12 is presumed to be 0.1 mm, and the frequency of excitation of vibration to be 60 kHz. Upon being solidified by desiccation, the toner is collected by the vortex. When the particle density distribution of the collected particles is measured under a measuring condition that is denoted hereinafter by a flow particle imaging analyzer, i.e., an FPIA-2000, the weight-average particle diameter, i.e., D4, was 5.4 µm, and the number-average particle diameter, i.e., Dn, was 4.9 µm. In addition, the quantity of the toner that was manufactured per hour was 295 g.

Third Example

The target toner was obtained under conditions identical to the first example, except that the oscillation surface 13A comprised a rectangular shape, and was bonded to the oscillation amplification device 22, further comprising a long side of 80 mm and a short side of 10 mm.

Upon being solidified by desiccation, the toner is collected by the vortex. When the particle density distribution of the collected particles is measured under a measuring condition that is denoted hereinafter by a flow particle imaging analyzer, i.e., an FPIA-2000, the weight-average particle diameter, i.e., D4, was 5.6 µm) and the number-average particle diameter, i.e., Dn, was 5.0 µm. In addition, the quantity of the toner that was manufactured per hour was 403 g.

Fourth Example

The target toner was obtained under conditions identical to the first example, except that the configuration of the droplet forming unit 2 that is depicted in FIG. 7 is presumed to apply, positioned in a linear array of 10 units, and the desiccation gaseous body flow volume is presumed to be 150.0 liters per minute of dry nitrogen internal to the apparatus. Upon being solidified by desiccation, the toner is collected by the vortex. When the particle density distribution of the collected particles is measured under a measuring condition that is denoted hereinafter by a flow particle imaging analyzer, i.e., an FPIA-2000, the weight-average particle diameter, i.e., D4, was 5.6 µm, and the number-average particle diameter, i.e., Dn, was 4.7 µm. In addition, the quantity of the toner that was manufactured per hour was 2480 g.

Fifth Example

The target toner was obtained under conditions identical to the first example, except that the configuration of the droplet forming unit 2 that is depicted in FIG. 10 is presumed to apply, positioned in a linear array of 10 units, the gaseous body for the dispersal is presumed to be 2.0 liters per minute with respect to each respective unit, and the desiccation gaseous body flow volume is presumed to he 150.0 liters per minute of dry nitrogen internal to the apparatus. Upon being solidified by desiccation, the toner is collected by the vortex. When the particle density distribution of the collected particles is measured under a measuring condition that is denoted hereinafter by a flow particle imaging analyzer, i.e., an FPIA-2000, the weight-average particle diameter, i.e., D4, was 5.4 μm, and the number-average particle diameter, i.e., Dn, was 4.9 μm. In addition, the quantity of the toner that was manufactured per hour was 2800 g.

Comparison Example

As a comparison example, the target toner was obtained under a condition wherein a metallic thin film is employed comprising a shape that is similar to the metallic thin film that is employed in the first example, the nozzle 11 is produced upon the metallic thin film by a nickel electro forming technique that is easily processed, and the metallic thin film comprises a thickness of 10 μm, the nozzle 11 comprises a diameter of ϕ10 μm, and the frequency of excitation of oscillation is 74 kHz. Upon being solidified by desiccation, the toner is collected by the vortex. When the particle density distribution of the collected particles is measured under a measuring condition that is denoted hereinafter by a flow particle imaging analyzer, i.e., an FPIA-2000, the weight-average particle diameter, i.e., D4, was 5.9 μm, and the number-average particle diameter, i.e., Dn, was 4.2 μm. In addition, the quantity of the toner that was manufactured per hour was 217 g.

The quantity of the toner that is manufactured improves relative to the comparison example, such as is depicted in Table 1. In addition, as a result of using the toner to perform the image assessment, the reproducibility of the fine line portion is also improved, and the characteristic value of the toner is also improved, relative to the comparison example.

TABLE 1

| | Weight-Average Diameter | Number-Average Diameter | Quantity of Toner Manufactured/h | Reproducibility of Fine Line Portion |
|---|---|---|---|---|
| 1st Example | 5.6 | 5.1 | 350 g | ◎ |
| 2nd Example | 5.5 | 4.9 | 295 g | ◎ |
| 3rd Example | 5.6 | 5 | 403 g | ◎ |
| 4th Example | 5.6 | 4.7 | 2480 g | ○ |
| 5th Example | 5.4 | 4.9 | 2800 g | ◎ |
| Comparison Example | 5.9 | 4.2 | 217 g | Δ |

Put another way, it is to be understood that it is possible to efficiently manufacture the toner according to the present invention, and moreover, that the toner thus manufactured manifests extremely fine characteristics. In addition, the image that is obtained by employing the toner that is produced by the method of manufacturing the toner according to the present invention to perform the development of the image comprises a great fidelity to the electrostatic latent image, and a highly superior image quality.

It is possible for the method of manufacturing the toner according to the present invention to manufacture the toner that is manufactured by the method thus described in an efficient manner, because the thin film comprises a rigid material, and furthermore, given that the particles that are comprised within the toner further comprise a uniformity of distribution of the particle density thereof that has heretofore not been achieved. Moreover, with respect to the many characteristic values that are demanded of the toner, i.e., liquidity or charging, the degree of fluctuation that arises from the particles that have been manufactured by the manufacturing methods to date is either not present at all, or is very minor, in the particles that have been manufactured by the manufacturing method according to the present invention, and may thus be used as the developing solution for developing the electrostatic latent image with respect to such as electrophotography, electrostatic recording, or electrostatic printing.

By way of the method of manufacturing the toner and the toner manufacturing device according to the present invention, the toner composition solution is formed into droplets and discharged from the thin film, which in turn is formed from the rigid material, and whereupon is formed the plurality of nozzles. It is thus possible to form the droplets within a large surface area, with the particles of a uniform size within a range of a largo surface area of the thin film. It is thereby possible to manufacture the toner efficiently, and furthermore, to obtain a uniformity of the dispersal of the particle density that has not been achieved heretofore.

By way of the toner that is manufactured by the method of manufacturing the toner according to the present invention, it is possible to significantly improve the many characteristic values that are demanded of the toner, such as the liquidity or the charging characteristic, over and above the conventional method of manufacturing the toner.

What is claimed is:

1. A method of manufacturing a toner, comprising: preparing a droplet forming device, comprising:

a solution storage portion configured to store a toner composition solution;

a thin film formed from a rigid material, bonded to the solution storage portion by way of a bonding material, and provided with at least one nozzle; and an oscillation device including an oscillation generation device configured to generate an oscillation upon the thin film and an oscillation amplification device which has an oscillation surface including a position that is parallel and opposite to the thin film and is configured to amplify the oscillation generated with the oscillation generation device;

periodically forming a droplet of the toner composition solution including at least a resin and a coloring agent to be supplied between the thin film and the oscillation surface and discharging the droplet via the at least one nozzle; and solidifying the droplet of the toner composition solution discharged via the at least one nozzle, and thereby forming a toner particle.

2. The method of manufacturing the toner according to claim 1, wherein the rigid material comprises a ceramic; and the nozzle is formed upon a surface region that is opposite to the oscillation surface.

3. The method of manufacturing the toner according to claim 2, wherein the droplet forming device is formed so as to comprise a larger area than a binding area configured to bond the oscillation surface of the oscillation amplification device to the oscillation generation device.

4. The method of manufacturing the toner according to claim 2, wherein
the oscillation amplification device comprises a horn shape.

5. The method of manufacturing the toner according to claim 2, wherein
the oscillation device further comprises an oscillation element of a bolt tightening Langevin type.

6. The method of manufacturing the toner according to claim 2, wherein
a frequency of the oscillation that is generated by the oscillation generation device falls into a range that is greater than or equal to 20 kHz and less than 2.0 MHz.

7. The method of manufacturing the toner according to claim 2, wherein
an aperture of the at least one nozzle falls into a range of between 3 μm and 35 μm.

* * * * *